United States Patent
Byun et al.

(10) Patent No.: US 9,727,183 B2
(45) Date of Patent: Aug. 8, 2017

(54) TOUCH SCREEN SENSOR INTEGRATED CIRCUIT, A METHOD OF OPERATING THE SAME, AND A SYSTEM INCLUDING THE SAME

(71) Applicant: SAMSUNG ELECTRONICS CO., LTD., Suwon-si, Gyeonggi-do (KR)

(72) Inventors: San Ho Byun, Bucheon-si (KR); Jun Chul Park, Daegu (KR); Ki Duk Kim, Hwaseong-si (KR); Yoon Kyung Choi, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 300 days.

(21) Appl. No.: 14/477,198

(22) Filed: Sep. 4, 2014

(65) Prior Publication Data

US 2015/0102827 A1 Apr. 16, 2015

(30) Foreign Application Priority Data

Oct. 10, 2013 (KR) ........................ 10-2013-0120817

(51) Int. Cl.
G06F 3/044 (2006.01)
G06F 3/041 (2006.01)

(52) U.S. Cl.
CPC ............ *G06F 3/044* (2013.01); *G06F 3/0416* (2013.01)

(58) Field of Classification Search
USPC ........ 324/679, 658, 649, 600, 686; 345/174, 345/173, 156
See application file for complete search history.

(56) References Cited

U.S. PATENT DOCUMENTS 5,929,592 A * 7/1999 Kwon ................. H02M 1/4233
                                                        318/801
7,663,607 B2 * 2/2010 Hotelling ............. G06F 3/0416
                                                        178/18.01

(Continued)

FOREIGN PATENT DOCUMENTS

JP 2011-113188 6/2011
JP 2012-234473 11/2012

(Continued)

OTHER PUBLICATIONS

Petri Eloranta et al. ,Current Conveyors: History, Theory applications and implementation; Nov. 3, 2004; CC,PPT/11.03.04/Petri Eloranta.*

(Continued)

*Primary Examiner* — Melissa Koval
*Assistant Examiner* — Nasima Monsur
(74) *Attorney, Agent, or Firm* — F. Chau & Associates, LLC

(57) ABSTRACT

A method of operating a touch screen sensor integrated circuit includes: receiving a plurality of current signals through a plurality of pins, wherein each current signal is generated according to mutual capacitance in response to a modulation signal; sensing the current signals and generating a plurality of sensed current signals corresponding to each of the current signals; and generating a plurality of subtracted current signals, wherein each subtracted current signal is generated by performing a subtraction on sensed current signals corresponding to a pair of the pins.

18 Claims, 21 Drawing Sheets

(56) References Cited

U.S. PATENT DOCUMENTS

| | | | |
|---|---|---|---|
| 7,800,594 B2 | 9/2010 | Nakamura et al. | |
| 7,876,311 B2 | 1/2011 | Krah et al. | |
| 2011/0025629 A1* | 2/2011 | Grivna | G06F 3/0416 345/173 |
| 2011/0115729 A1 | 5/2011 | Kremin et al. | |
| 2011/0210941 A1 | 9/2011 | Reynolds et al. | |
| 2012/0049868 A1* | 3/2012 | Maharyta | G06F 3/044 324/679 |
| 2012/0194469 A1* | 8/2012 | Wang | G06F 3/044 345/174 |
| 2013/0063395 A1 | 3/2013 | Byun et al. | |
| 2013/0314109 A1* | 11/2013 | Kremin | G01R 27/2605 324/686 |

FOREIGN PATENT DOCUMENTS

| | | |
|---|---|---|
| KR | 1020060099198 | 9/2006 |
| WO | 2010048226 | 4/2010 |

OTHER PUBLICATIONS

Walt Kester; Analog Devices (Basic DAC Architectures II: Binary DACs-MT015 Tutorial;Copyright 2009, Analog Devices, Inc.*

* cited by examiner

FIG. 8B
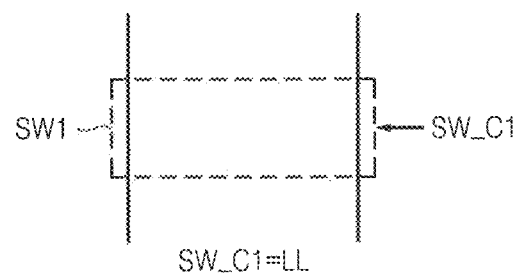
(a)
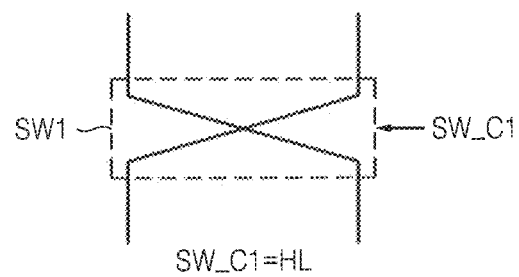
(b)

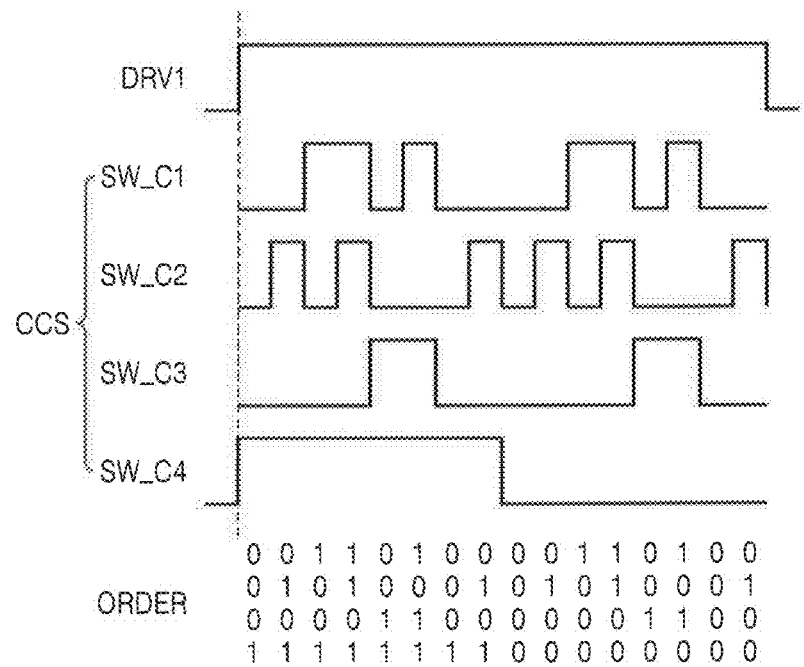

FIG. 19

|  | Y1 | DVS1<br>Y2 | DVS2<br>Y3 | DVS3<br>Y4 | DVS4<br>Y5 | DVS5 |
|---|---|---|---|---|---|---|
| DVS |  | (0)*Zd+E | (C1)*Zd+E | (C2−C1)*Zd+E | (C3−C2)*Zd+E | (0−C3)*Zd+E |
| INTEGRATED DVS | 0 | E | C1*Zd+2*E | C2*Zd+3*E | C3*Zd+4*E |  |
| ERROR COMPENSATION | 0 | −1/5*(5*E) | −2/5*(5*E) | −3/5*(5*E) | −4/5*(5*E) |  |
| FINAL VALUE | 0 | 0 | C1*Zd | C2*Zd | C3*Zd |  |

TOUCH SCREEN SENSOR INTEGRATED CIRCUIT, A METHOD OF OPERATING THE SAME, AND A SYSTEM INCLUDING THE SAME

CROSS-REFERENCE TO RELATED APPLICATION

This application claims priority under 35 U.S.C. §119(a) to Korean Patent Application No. 10-2013-0120817 filed on Oct. 10, 2013, the disclosure of which is incorporated by reference herein in its entirety.

TECHNICAL FIELD

The inventive concept relates to a touch screen sensor integrated circuit (IC), a method of operating the same, and a system including the same.

DISCUSSION OF THE RELATED ART

A capacitive-type touch system is widely applied to mobile applications such as smart phones and tablet personal computers (PCs). The capacitive-type touch system has high durability and light transmittance as well as multi-touch and soft-touch features. The capacitive-type touch system may require certain characteristics and/or features, such as true multi-touch detection, high noise immunity, and low power consumption. Therefore, a touch controller that can meet these requirements is desired.

SUMMARY

According to an exemplary embodiment of the inventive concept, there is provided a method of operating a touch screen sensor integrated circuit (IC). The method includes receiving a plurality of current signals through a plurality of pins, wherein each current signal is generated according to mutual capacitance in response to a modulation signal; sensing the current signals and generating a plurality of sensed current signals corresponding to each of the current signals; and generating a plurality of subtracted current signals, wherein each subtracted current signal is generated by performing a subtraction on sensed current signals corresponding to a pair of the pins.

The sensed current signals may include first sensed current signals and second sensed current signals respectively corresponding to one of the first sensed current signals. A phase of each of the first sensed current signals may be opposite to a phase of a corresponding one of the second sensed current signals.

Generating the subtracted current signals may include adding one of the first sensed current signals, which corresponds to one of two pins in a pair, and one of the second sensed current signals, which corresponds to the other one of the two pins, according to a demodulation signal.

The two pins may correspond to adjacent channels or peripheral channels.

The method may further include generating fine current signals by multiplying the subtracted current signals by a sine wave.

The method may further include generating output voltage signals respectively corresponding to the fine current signals.

Generating the output voltage signals may include removing a high-frequency component from the fine current signals.

According to an exemplary embodiment of the inventive concept, there is provided a touch screen sensor IC including a plurality of pins configured to receive a plurality of current signals, wherein each current signal is generated according to mutual capacitance in response to a modulation signal; a current conveyor configured to sense the current signals and generate a plurality of sensed current signals corresponding to each of the current signals; and a mixer configured to generate a plurality of subtracted current signals, wherein each subtracted current signal is generated by performing a subtraction on sensed current signals corresponding to a pair of the pins.

The sensed current signals may include first sensed current signals and second sensed current signals respectively corresponding to one of the first sensed current signals. A phase of each of the first sensed current signals may be opposite to a phase of a corresponding one of the second sensed current signals.

The current conveyor may include a plurality of unit current conveyors respectively corresponding to the pins. Each of the unit current conveyors may include an operational amplifier configured to generate a first control voltage and a second control voltage according to one of the current signals and a current copy circuit configured to generate one of the first sensed current signals and one of the second sensed current signals according to the first control voltage and the second control voltage.

The mixer may add one of the first sensed current signals, which corresponds to one of two pins in a pair, and one of the second sensed current signals, which corresponds to the other one of the two pins, according to a demodulation signal.

The two pins may correspond to adjacent channels or peripheral channels.

The touch screen sensor IC may further include a sine-shape resampler configured to generate fine current signals by multiplying the subtracted current signals by a sine wave.

The sine-shape resampler may include a plurality of unit sine-shape resamplers respectively corresponding to the subtracted current signals. Each of the unit sine-shape resamplers may be an R-2R ladder digital-to-analog converter including a plurality of transistors that operate according to digital sine-wave signals.

The touch screen sensor IC may further include a current-to-voltage converter configured to generate output voltage signals respectively corresponding to the fine current signals.

The touch screen sensor IC may further include an analog-to-digital converter (ADC) configured to convert the output voltage signals into digital voltage signals and a micro controller unit (MCU) configured to sequentially integrate the digital voltage signals and generate touch voltage signals respectively corresponding to the current signals.

The pins may include first through m-th pins respectively connected to first through m-th sensing lines of a touch screen panel. The MCU may compensate the sequentially integrated digital voltage signals using a result of integrating the digital voltage signals respectively corresponding to the first through m-th pins.

According to an exemplary embodiment of the inventive concept, there is provided a touch screen sensor IC including a plurality of pins configured to receive a plurality of current signals, wherein each current signal is generated according to mutual capacitance in response to a modulation signal; a current conveyor configured to sense the current signals and generate a plurality of sensed current signals corresponding to each of the current signals; and a mixer configured to output the sensed current signals according to a mode selection signal, or generate a plurality of subtracted current signals, wherein each subtracted current signal is generated by performing a subtraction on sensed current signals corresponding to a pair of the pins.

The sensed current signals may include first sensed current signals and second sensed current signals respectively corresponding to one of the first sensed current signals. A phase of each of the first sensed current signals may be opposite to a phase of a corresponding one of the second sensed current signals.

The current conveyor may include a plurality of unit current conveyors respectively corresponding to the pins. Each of the unit current conveyors may include an operational amplifier configured to generate a first control voltage and a second control voltage according to one of the current signals and a current copy circuit configured to generate one of the first sensed current signals and one of the second sensed current signals according to the first control voltage and the second control voltage.

The mixer may add one of the first sensed current signals, which corresponds to one of two pins in a pair, and one of the second sensed current signals, which corresponds to the other one of the two pins, according to a demodulation signal.

The two pins may correspond to adjacent channels.

According to an exemplary embodiment of the inventive concept, there is provided a system including a touch screen sensor IC configured to receive a plurality of current signals, wherein each current signal is generated according to mutual capacitance in response to a modulation signal; and a host controller configured to communicate with the touch screen sensor IC. The touch screen sensor IC may include a current conveyor configured to sense the current signals and generate a plurality of sensed current signals corresponding to each of the current signals and a mixer configured to generate a plurality of subtracted current signals, wherein each subtracted current signal is generated by performing a subtraction on sensed current signals corresponding to a pair of a plurality of pins.

According to an exemplary embodiment of the inventive concept, a touch screen sensor integrated circuit comprises: a current conveyor configured to generate a pair of sensed current signals for each received current signal; a mixer configured to perform a subtraction operation on the pairs of sensed current signals to generate a plurality of subtracted current signals; a sine-shape resampler configured to generate a plurality of fine current signals by multiplying the subtracted current signals by a sine wave; and a current converter configured to generate a plurality of output voltage signals by removing a high-frequency component of the fine current signals.

The touch screen sensor integrated circuit may further comprise: an analog-to-digital converter configured to convert the output voltage signals into digital voltage signals; and a micro controller unit configured to integrate the digital voltage signals to generate a touch voltage signal corresponding to the received current signals.

BRIEF DESCRIPTION OF THE DRAWINGS

The above and other features of the inventive concept will become more apparent by describing in detail exemplary embodiments thereof with reference to the attached drawings in which:

FIG. 8B is a diagram for explaining the operation of a first switch illustrated in FIG. 8A, according to an exemplary embodiment of the inventive concept;

FIG. 9 is a timing chart of copy circuit control signals applied to the current copy circuit illustrated in FIG. 8A, according to an exemplary embodiment of the inventive concept;

FIG. 19 is a table for explaining the operation of the MCU according to the graph illustrated in FIG. 18, according to an exemplary embodiment of the inventive concept.

DETAILED DESCRIPTION OF THE EMBODIMENTS

Hereinafter, exemplary embodiments of the inventive concept will be described in detail with reference to the accompanying drawings. The inventive concept may be embodied in many different forms and should not be construed as limited to the embodiments set forth herein.

It will be understood that when an element is referred to as being "connected" or "coupled" to another element, it can be directly connected or coupled to the other element or intervening elements may be present.

As used herein, the singular forms "a", "an" and "the" are intended to include the plural forms as well, unless the context clearly indicates otherwise.

Figure 1:
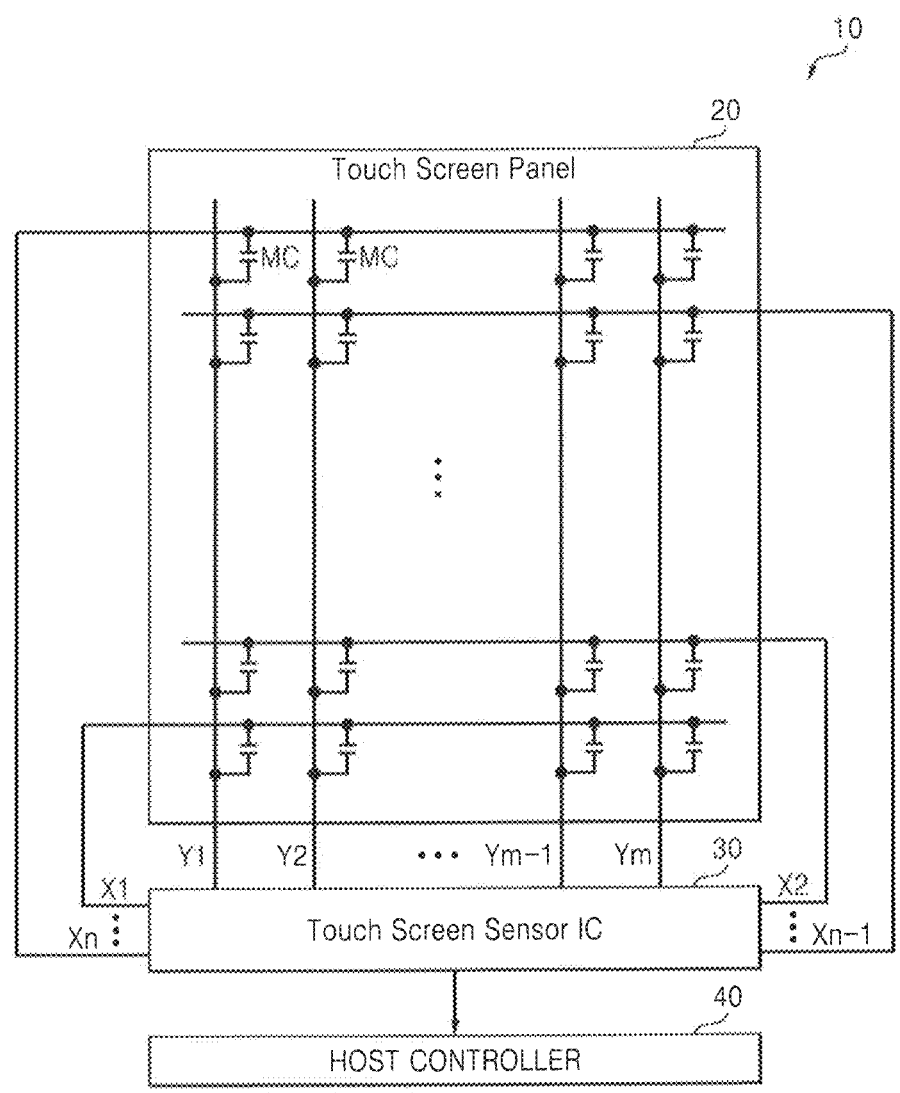
FIG. 1 is a schematic block diagram of a system including a touch screen sensor integrated circuit (IC) according to an exemplary embodiment of the inventive concept.
Figure 2:
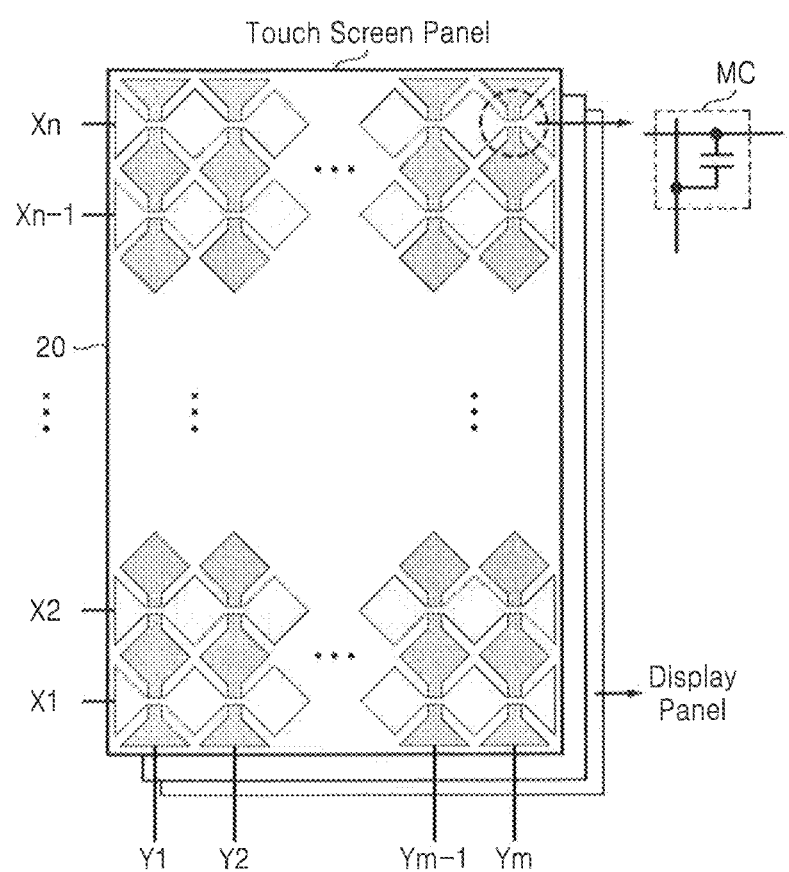
FIG. 2 is a diagram of a single-layer capacitive touch screen panel illustrated in FIG. 1, which has a diamond pattern, according to an exemplary embodiment of the inventive concept.

FIG. 1 is a schematic block diagram of a system 10 including a touch screen sensor integrated circuit (IC) 30 according to an exemplary embodiment of the inventive concept. FIG. 2 is a diagram of a single-layer capacitive touch screen panel 20 illustrated in FIG. 1, which has a diamond pattern, according to an exemplary embodiment of the inventive concept.

Referring to FIG. 1, the system 10 includes the touch screen panel 20, the touch screen sensor IC 30, and a host controller (or an application processor (AP)) 40. For the sake of convenience, a display panel and a display panel driver IC for driving the display panel are not illustrated in FIG. 1. The system 10 may be a mobile application such as a cellular phone, a smart phone, a tablet personal computer (PC), a personal digital assistant (PDA), a portable multimedia player (PMP), or an MP3 player.

As shown in FIG. 2, the touch screen panel 20 may be a single-layer capacitive touch screen panel having a diamond pattern. The single-layer capacitive touch screen panel includes a plurality of driving lines X1 through Xn (where "n" is a natural number, e.g., 18) and a plurality of sensing lines Y1 through Ym (where "m" is a natural number, e.g., 11). The driving lines X1 through Xn may be called horizontal lines and the sensing lines Y1 through Ym may be called vertical lines. The sensing lines Y1 through Ym may also be called first through m-th channels.

In an exemplary embodiment of the inventive concept, some driving lines, e.g., odd-numbered driving lines among the driving lines X1 through Xn illustrated in FIG. 1, may each transmit a driving signal applied to the left side of the touch screen panel 20 and the remaining driving lines, e.g., even-numbered driving lines among the driving lines X1 through Xn, may each transmit a driving signal applied to the right side of the touch screen panel 20. In an exemplary embodiment of the inventive concept, the driving lines X1 through Xn may be arranged to respectively transmit a plurality of driving signals applied to the left or right side of the touch screen panel 20.

The driving lines X1 through Xn and the sensing lines Y1 through Ym may be electrically isolated from one another using a bridge connection similar to a via process in complementary metal oxide semiconductor (CMOS) technology.

A mutual capacitance node MC is formed at each crossing point between the driving lines X1 through Xn and the sensing lines Y1 through Ym, as shown in FIGS. 1 and 2, so that a two-dimensional n*m mutual capacitance profile is obtained from the touch screen panel 20. When a finger or conductive substance touches the touch screen panel 20, the mutual capacitance profile of the touch screen panel 20 changes. Therefore, the touch screen sensor IC 30 can accurately find a touch point based on the change in the mutual capacitance profile. The touch screen sensor IC 30 applies a driving signal to each of the driving lines X1 through Xn, processes a current signal output from each of the sensing lines Y1 through Ym, and transmits signals obtained as the processing result to the host controller 40. The structure and operations of the touch screen sensor IC 30 will be described in detail with reference to FIGS. 3 through 20.

Figure 3:
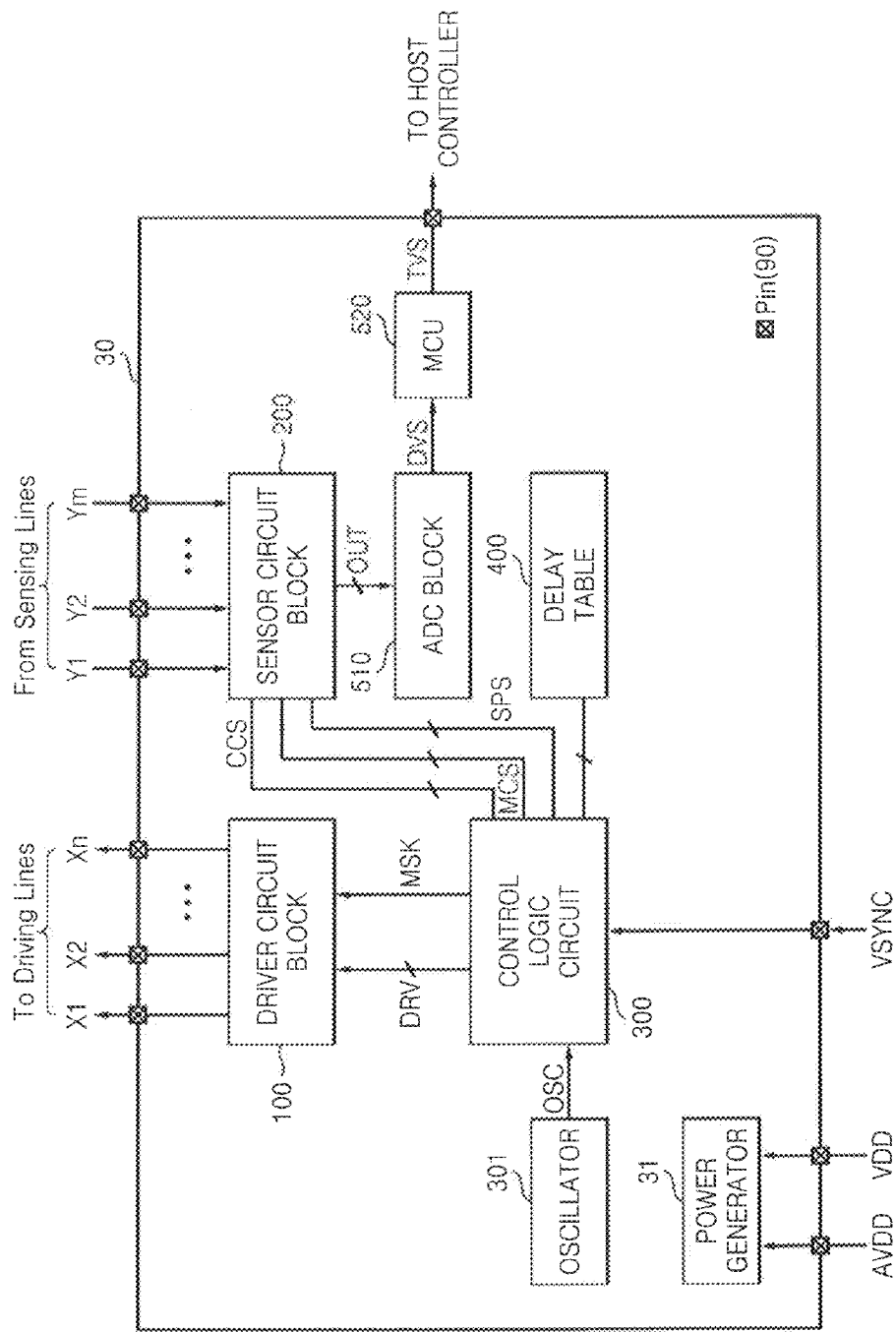
FIG. 3 is a schematic block diagram of the touch screen sensor IC illustrated in FIG. 1, according to an exemplary embodiment of the inventive concept.
Figure 4:
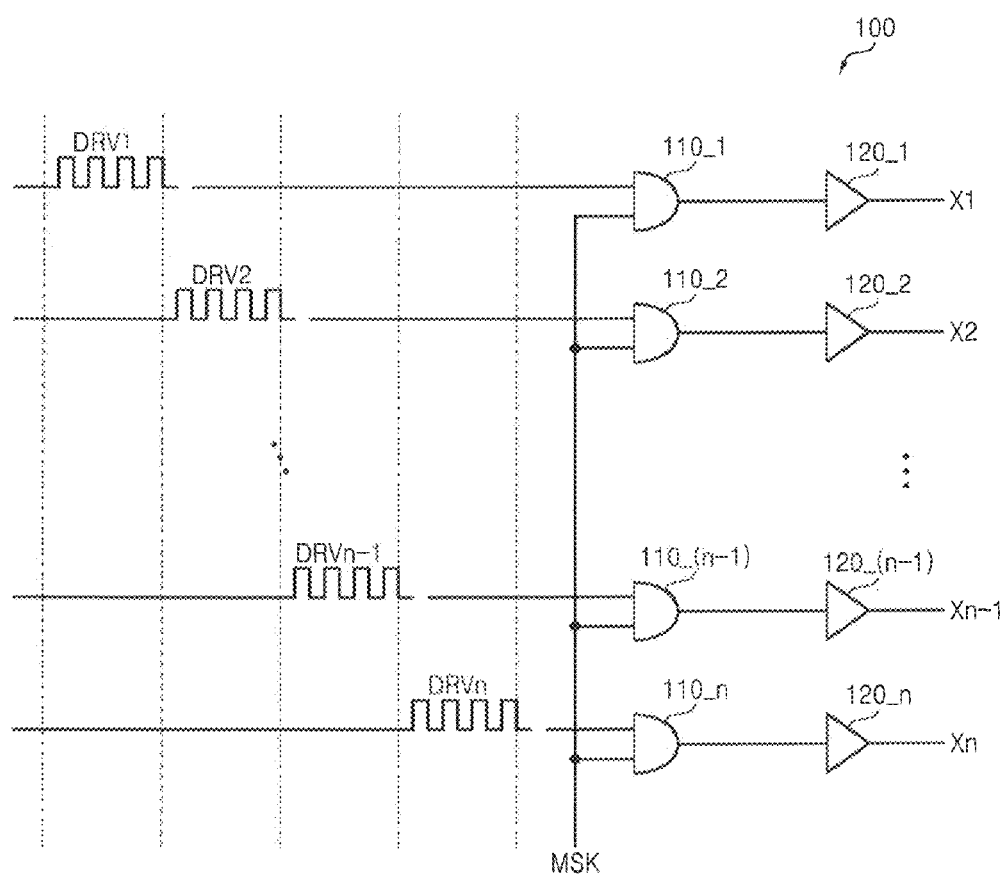
FIG. 4 is a schematic block diagram of a driver circuit block illustrated in FIG. 3, according to an exemplary embodiment of the inventive concept.

FIG. 3 is a schematic block diagram of the touch screen sensor IC 30 illustrated in FIG. 1, according to an exemplary embodiment of the inventive concept. FIG. 4 is a schematic block diagram of a driver circuit block 100 illustrated in FIG. 3, according to an exemplary embodiment of the inventive concept. Referring to FIG. 3, the touch screen sensor IC 30 includes a power generator 31, a plurality of pins 90, the driver circuit block 100, a sensor circuit block 200, a control logic circuit 300, an oscillator 301, a delay table (e.g., a memory storing the delay table) 400, an analog-to-digital convertor (ADC) block 510, and a micro controller unit (MCU) 520.

The power generator 31 generates power or voltage needed in the touch screen sensor IC 30 by using a plurality of external voltages AVDD and VDD. For instance, the power generator 31 may include a DC-DC converter that generates a voltage necessary for the operation of each of the elements 100, 200, and 510 and a low dropout (LDO) regulator that generates a voltage necessary for the operation of the control logic circuit 300.

The pins 90 may be connected to the touch screen panel 20 or the host controller 40 to transmit and receive various signals. For instance, each of the pins 90 may be connected with one of the driving lines X1 through Xn and the sensing lines Y1 through Ym to transmit one of a plurality of driving signals DRV1 through DRVn or receive one of a plurality of current signals IS1 through ISm.

The driver circuit block 100 may transmit or block driving signals DRV to/from the driving lines X1 through Xn in response a mask control signal MSK and the driving signals DRV received from the control logic circuit 300. Referring to FIG. 4, the driver circuit block 100 functions as a transmitter and includes a plurality of mask circuits 110_1 through 110_n and a plurality of drivers 120_1 through 120_n.

The mask circuits 110_1 through 110_n may transmit or mask (or block) the driving signals DRV1 through DRVn, respectively, to the drivers 120_1 through 120_n, respectively, in response to the mask control signal MSK. The driving signals DRV1 through DRVn may be square waves sequentially generated without overlapping one another. The driving signals DRV include the driving signals DRV1 through DRVn and may correspond to a modulation signal.

Each of the mask circuits 110_1 through 110_n may be an AND gate. Accordingly, when the mask control signal MSK is at logic "1" or a second level, e.g., a high level, the AND gates transmit the driving signals DRV1 through DRVn to the drivers 120_1 through 120_n. When the mask control signal MSK is at logic "0" or a first level, e.g., a low level, the AND gates mask or block the transmission of the driving signals DRV1 through DRVn to the drivers 120_1 through 120_n.

Each of the drivers 120_1 through 120_11 may be an inverter chain. Output terminals of the respective drivers 120_1 through 120_n are connected to the driving lines X1 through Xn, respectively.

The driver circuit block 100 sequentially applies the driving signals DRV1 through DRVn to the driving lines X1 through Xn, respectively, in response to the mask control signal MSK at the second level, e.g., the high level. However, the driver circuit block 100 blocks the transmission of the driving signals DRV1 through DRVn to the driving lines X1 through Xn in response to the mask control signal MSK at the first level, e.g., the low level.

The sensor circuit block 200 may process current signals respectively output from the sensing lines Y1 through Ym according to the control of the control logic circuit 300 and may generate output voltage signals OUT according to the processing result. The sensor circuit block 200 will be described in detail with reference to FIG. 5.

The control logic circuit 300 controls the overall operation of the touch screen sensor IC 30. The control logic circuit 300 may control the operation of at least one of the elements 31, 100, 200, 301, 400, 510, and 520.

Figure 5:
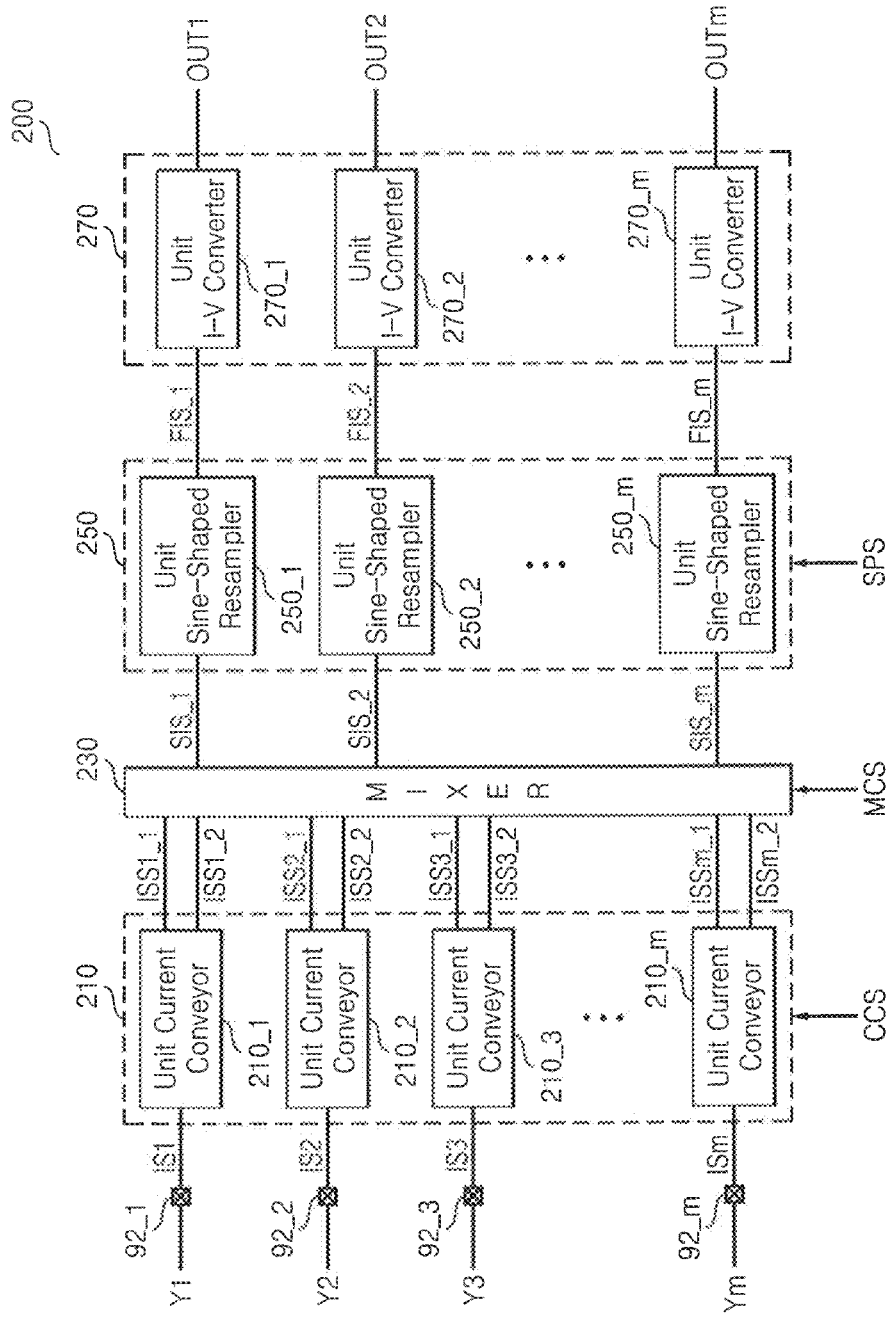
FIG. 5 is a detailed block diagram of a sensor circuit block illustrated in FIG. 3, according to an exemplary embodiment of the inventive concept.

The control logic circuit 300 may generate copy circuit control signals CCS for controlling a current conveyor 210 of the sensor circuit block 200 illustrated in FIG. 5, mixer control signals MCS for controlling a mixer 230 of the sensor circuit block 200, and sine-shaped signals SPS for controlling a sine-shape resampler 250 of the sensor circuit block 200. The control logic circuit 300 may operate in synchronization with or regardless of an external vertical synchronous signal VSYNC.

The oscillator 301 may apply an oscillation signal OSC to the control logic circuit 300. The control logic circuit 300 may generate the driving signals DRV and the control signals MSK, CCS, MCS, and SPS using the oscillation signal OSC.

The delay table 400 may store phase delay information used to control the phase delay of the sensor circuit block 200. The phase delay information stored in the delay table 400 may be used by the control logic circuit 300. The delay table 400 may be stored in non-volatile memory or volatile memory such as static random access memory (SRAM).

In an exemplary embodiment of the inventive concept, the control logic circuit 300 may control the timing of the control signals CCS, MCS, and SPS for controlling the sensor circuit block 200 based on the phase delay information. In other words, the control logic circuit 300 may control delays including a delay introduced while the driving signals DRV1 through DRVn are output as the current signals IS1 through ISm via the touch screen panel 20 by controlling the timing of the control signals CCS, MCS, and SPS using the phase delay information.

The ADC block 510 includes a plurality of ADCs which respectively convert output voltage signals OUT1 through OUTm of respective unit current-to-voltage (I-V) converters 270_1 through 270_m illustrated in FIG. 5 into a digital voltage signal DVS. Each of the ADCs may be a successive approximation (SAR) ADC.

The MCU 520 may sequentially integrate digital voltage signals DVS output from the ADC block 510 and may generate a touch voltage signal TVS corresponding to the current signals IS1 through ISm from the integration result. The touch voltage signal TVS may include X and Y coordinates of a touch point and information about a touch level for each coordinate. The MCU 520 transmits the touch voltage signal TVS to the host controller 40. The MCU 520 may transmit the touch voltage signal TVS to the host controller 40 using an inter-integrated circuit (I²C).

When pins respectively connected to the sensing lines Y1 through Ym are respectively referred to as first through m-th pins 92_1 through 92_m, the MCU 520 may remove sensing noise from sequentially integrated digital voltage signals (integrated DVS in FIG. 19) using a digital voltage signal DVS corresponding to the first and m-th pins 92_1 and 92_m and a result of integrating digital voltage signals DVS respectively corresponding to the first through m-th pins 92_1 through 92_m. The removing of the sensing noise will be described in detail with reference to FIGS. 18 and 19 later.

FIG. 5 is a detailed block diagram of the sensor circuit block 200 illustrated in FIG. 3, according to an exemplary embodiment of the inventive concept. Referring to FIGS. 3 and 5, the sensor circuit block 200 may include the current conveyor 210, the mixer 230, the sine-shape resampler 250, and an I-V converter 270.

The current conveyor 210 may sense the current signals IS1 through ISm from the respective pins 92_1 through 92_m respectively connected to the sensing lines Y1 through Ym and may generate each pair of sensed current signals ISS1_1 and ISS1_2 through ISSm_1 and ISSm_2, which corresponds to each of the current signals IS1 through ISm. The current conveyor 210 includes a plurality of unit current conveyors 210_1 through 210_m respectively corresponding to the pins 92_1 through 92_m.

The sensed current signals ISS1_1 through ISSm_2 include first sensed current signals ISS1_1 through ISSm_1 and second sensed current signals ISS1_2 through ISSm_2 respectively corresponding to the first sensed current signals ISS1_1 through ISSm_1. The phase of the first sensed current signals ISS1_1 through ISSm_1 may be opposite (e.g., have a 180-degree difference) to the phase of the second sensed current signals ISS1_2 through ISSm_2.

The mixer 230 may generate each of subtracted current signals SIS_1 through SIS_m by performing a subtraction on sensed current signals corresponding to two of the pins 92_1 through 92_m among the sensed current signals ISS1_1 through ISSm_2. Accordingly, each of the subtracted current signals SIS_1 through SIS_m is related to two signals among the current signals IS1 through ISm.

The current signals IS1 through ISm include common noise components, e.g., display noise and thermal noise. The display noise may be due to vertical capacitance between a display panel (not shown) and the touch screen panel 20. The common noise components are almost the same between current signals (e.g., IS1 and IS2) generated from adjacent sensing lines among the sensing lines Y1 through Ym and can be removed by the operation of the mixer 230. Therefore, the dynamic range of the output voltage signals OUT1 through OUTm can be increased.

In an exemplary embodiment of the inventive concept, the mixer 230 may add one of the first sensed current signals ISS1_1 through ISSm_1, which corresponds to one of two pins among the pins 92_1 through 92_m, and one of the second sensed current signals ISS1_2 through ISSm_2, which corresponds to the other of the two pins, according to the mixer control signals MCS to generate one of the subtracted current signals SIS_1 through SIS_m.

The sine-shape resampler 250 may generate fine current signals FIS_1 through FIS_m by multiplying the subtracted current signals SIS_1 through SIS_m by a sine wave. The sine-shape, resampler 250 includes a plurality of unit sine-shape resamplers 250_1 through 250_m respectively corresponding to the subtracted current signals SIS_1 through SIS_m.

The sine wave may have the same frequency as a modulation signal, e.g., the driving signals DRV. The sine-shape resampler 250 may effectively remove high-frequency noise by multiplying the subtracted current signals SIS_1 through SIS_m by the sine wave having the same frequency as the modulation signal.

The I-V converter 270 generates the output voltage signals OUT1 through OUTm respectively corresponding to the fine current signals FIS_1 through FIS_m. The I-V converter 270 includes a plurality of the unit I-V converters 270_1 through 270_m respectively corresponding to the fine current signals FIS_1 through FIS_m. The I-V converter 270 also removes a high-frequency component from the fine current signals FIS_1 through FIS_m.

The operations of the current conveyor 210, the mixer 230, the sine-shape resampler 250, and the I-V converter 270 will be described in detail with reference to FIGS. 6 through 17.

According to an exemplary embodiment of the inventive concept, the touch screen sensor IC 30 generates an output signal by performing a subtraction on current signals, thereby removing common noise components, reducing the delay between input and output, and increasing a dynamic range, in addition, the touch screen sensor IC 30 effectively removes high-frequency noise using a sine wave.

Figure 6:
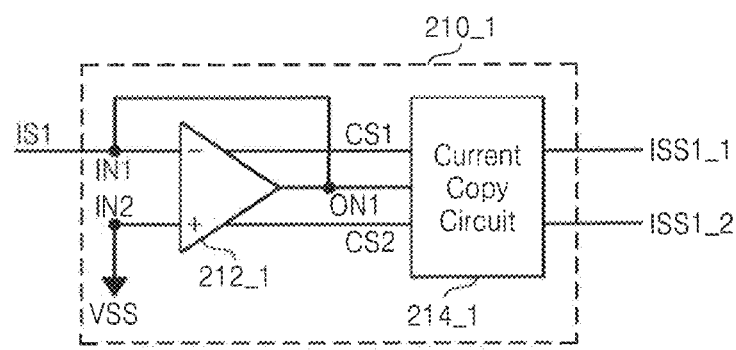
FIG. 6 is a detailed block diagram of a unit current conveyor illustrated in FIG. 5, according to an exemplary embodiment of the inventive concept.
Figure 7:
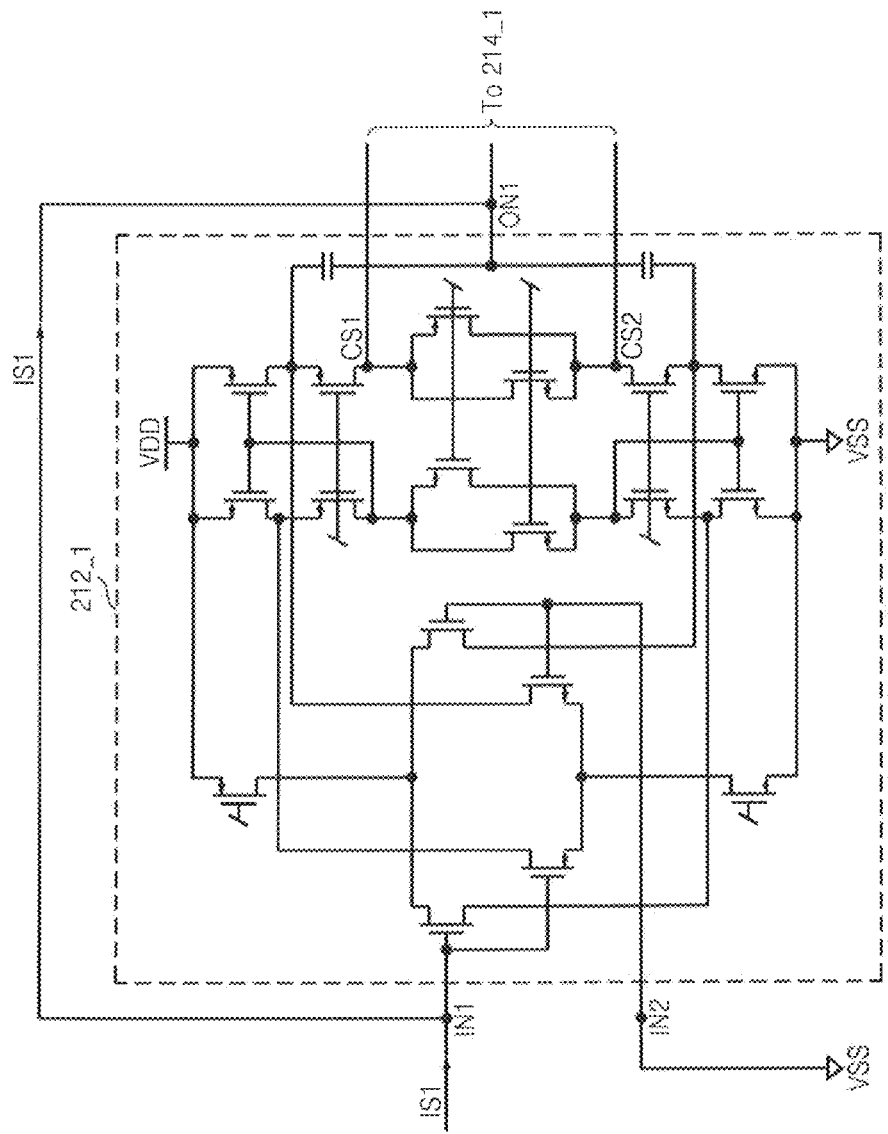
FIG. 7 is a detailed block diagram of an operational amplifier illustrated in FIG. 6, according to an exemplary embodiment of the inventive concept.
Figure 8A:
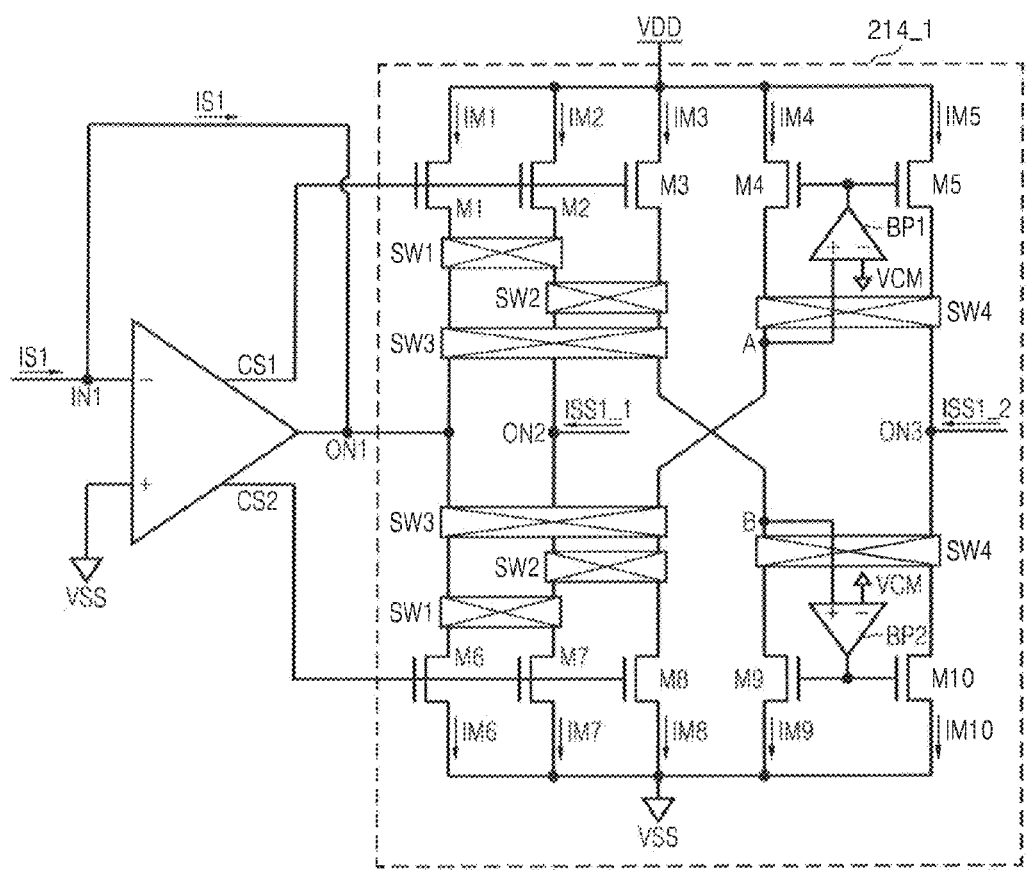
FIG. 8A is a detailed block diagram of a current copy circuit illustrated in FIG. 6, according to an exemplary embodiment of the inventive concept.
Figure 10:
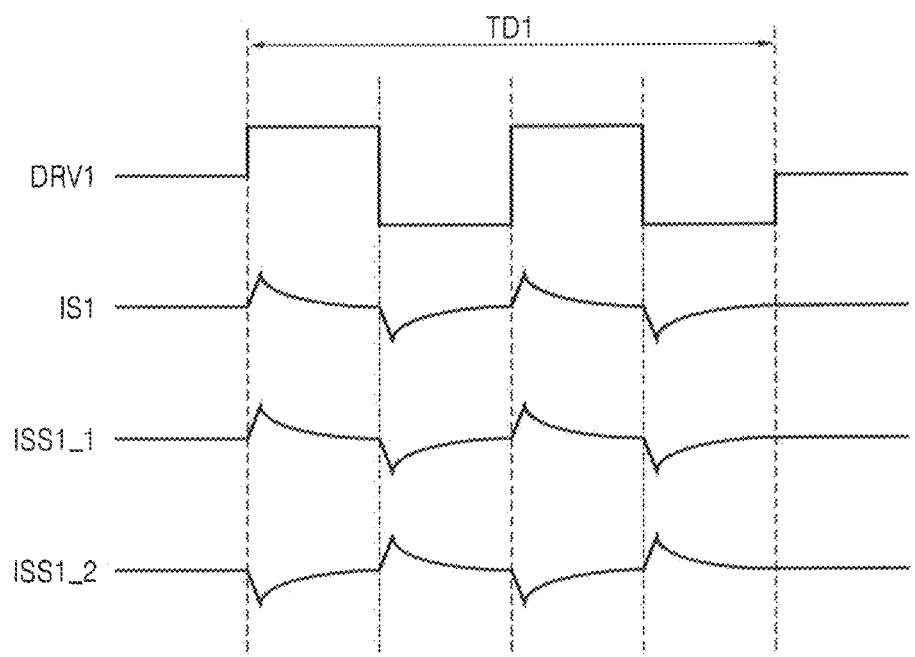
FIG. 10 is a timing chart of input/output signals of the unit current conveyor illustrated in FIG. 6, according to an exemplary embodiment of the inventive concept.

FIG. 6 is a detailed block diagram of the unit current conveyor 210_1 illustrated in FIG. 5, according to an exemplary embodiment of the inventive concept. FIG. 7 is a detailed block diagram of an operational amplifier 212_1 illustrated in FIG. 6, according to an exemplary embodiment of the inventive concept. FIG. 8A is a detailed block diagram of a current copy circuit 214_1 illustrated in FIG. 6, according to an exemplary embodiment of the inventive concept. FIG. 8B is a diagram for explaining the operation of a first switch SW1 illustrated in FIG. 8A, according to an exemplary embodiment of the inventive concept. FIG. 9 is a timing chart of copy circuit control signals applied to the current copy circuit 214_1 illustrated in FIG. 8A, according to an exemplary embodiment of the inventive concept. FIG. 10 is a timing chart of input/output signals of the unit current conveyor 210_1 illustrated in FIG. 6, according to an exemplary embodiment of the inventive concept.

Referring to FIGS. 5 and 6, the unit current conveyor 210_1 may include the operational amplifier 212_1 and the current copy circuit 214_1. Only one unit current conveyor 210_1 among the unit current conveyors 210_1 through 210_m is explained since the other unit current conveyors 210_2 through 210_m are substantially the same as the unit current conveyor 210_1.

The operational amplifier 212_1 includes a first input terminal IN1 for receiving the first current signal IS1, a second input terminal IN2 for receiving a reference voltage VSS, and a first output terminal ON1 connected with the first input terminal IN1. The first input terminal IN1 is an inverting terminal and the second input terminal IN2 is a non-inverting terminal. The reference voltage VSS may be a ground voltage.

Referring to FIG. 7, the operational amplifier 212_1 may be called a voltage follower and may transmit the first current signal IS1 to the first output terminal ON1. The operational amplifier 212_1 is described with reference to FIG. 1 in U.S. Pat. No. 7,652,538, entitled "Circuit and Methods for Improving Slew Rate of Differential Amplifiers," the disclosure of which is incorporated by reference herein in its entirety. Thus, detailed descriptions of the operational amplifier 212_1 will be omitted.

The current copy circuit 214_1 generates the first sensed current signal ISS1_1 and the second sensed current signal ISS1_2 corresponding to the first sensed current signal ISS1_1 according to a plurality of control voltages, e.g., a first control voltage CS1 and a second control voltage CS2 output from the operational amplifier 212_1.

Referring to FIG. 8A, the current copy circuit 214_1 includes ten transistors M1 through M10 connected between a power supply voltage VDD and the reference voltage VSS, a plurality of buffers BP1 and BP2, and a plurality of switches SW1 through SW4. The transistors M1 through M5 connected to the power supply voltage VDD may be P-channel metal oxide semiconductor (PMOS) transistors and the transistors M6 through M10 connected to the reference voltage VSS may be N-channel MOS (NMOS) transistors. For the sake of convenience, the generation of the first and second sensed current signals ISS1_1 and ISS1_2 will be described, assuming that the switches SW1 through SW4 are omitted.

The transistors M1 through M10 may have the same size (e.g., length and width) as one another. The first through third transistors M1 through M3 are controlled by the first control voltage CS1 and the sixth through eighth transistors M6 through M8 are controlled by the second control voltage CS2. Accordingly, a current IM1 flowing in the first transistor M1 is the same as a current IM2 flowing in the second transistor M2 and a current IM3 flowing in the third transistor M3 and a current IM6 flowing in the sixth transistor M6 is the same as a current IM7 flowing in the seventh transistor M7 and a current IM8 flowing in the eighth transistor M8.

The current IS1 flowing from the first input terminal IN1 to the first output terminal ON1 is the same as the difference between the current IM6 flowing in the sixth transistor M6 and the current IM1 flowing in the first transistor M1. The current IS1 may be defined as Equation 1:

$$IS1 = IM6 - IM1. \quad (1)$$

The first sensed current signal ISS1_1 output from a second output terminal ON2 is the same as the difference between the current IM2 flowing in the second transistor M2 and the current IM7 flowing in the seventh transistor M7. The first sensed current signal ISS1_1 may be defined as Equation 2:

$$ISS1\_1 = IM7 - IM2 = IS1. \quad (2)$$

The second and seventh transistors M2 and M7 are added to the first and sixth transistors M1 and M6, respectively, to sense the first current signal IS1, so that the first sensed current signal ISS1_1 having the same phase as the first current signal IS1 is extracted.

A current IM9 obtained by copying the current IM3 flowing in the third transistor M3 response to the first control voltage CS1 flows in the ninth transistor M9. A current IM4 obtained by copying the current IM8 flowing in the eighth transistor M8 in response to the second control voltage CS2 flows in the fourth transistor M4.

The second sensed current signal ISS1_2 output from a third output terminal ON3 may be defined as Equation 3:

$$ISS1\_2 = IM10 - IM5. \quad (3)$$

The current IM1 flowing in the first transistor M1 is the same as the current IM3 flowing in the third transistor M3 and the current IM6 flowing in the sixth transistor M6 is the same as the current IM8 flowing in the eighth transistor M8. Through current mirroring, the current IM10 is the same as the current IM3 and the current IM5 is the same as the current IM8. Accordingly, the current IM10 is the same as the current IM1 and the current IM5 is the same as the current IM6. The buffers BP1 and BP2 fix nodes A and B to a common voltage VCM. Therefore, inflow of external noise through the current mirroring is minimized. Consequently, the second sensed current signal ISS1_2 may be expressed as Equation 4:

$$ISS1\_2 = IM1 - IM10 = -IS1. \quad (4)$$

A plurality of the transistors M3 through M5 and a plurality of the transistors M8 through M10 are added to the first transistor M1 and the sixth transistor M6 to sense the first current signal IS1, so that the second sensed current signal ISS1_2 having a phase opposite to the phase of the first current signal IS1 is extracted.

The switches SW1 through SW4 include first through fourth switches SW1 through SW4. The copy circuit control signals CCS includes first through fourth switch control signals SW_C1 through SW_C4.

Referring to FIG. 8B, the first switch SW1 may form a current path as shown in (a) when the first switch control signal SW_C1 is at a low level LL and may form the current path as shown in (b) when the first switch control signal SW_C1 is at a high level HL. The second switch SW2 may operate according to the second switch control signal SW_C2 in substantially the same manner as the first switch SW1.

The third switch SW3 may switch between a current path connected to the first output terminal ON1 and a current path connected to the node B (when the third switch SW3 is positioned in an upper portion) or the node A (when the third switch SW3 is positioned in a lower portion) according to the third switch control signal SW_C3 in substantially the same manner as the first switch SW1. The fourth switch SW4 may switch between a current path connected to the third output terminal ON3 and a current path connected to the node A (when the fourth switch SW4 is positioned in the upper portion) or the node B (when the fourth switch SW4 is positioned in the lower portion) according to the fourth switch control signal SW_C4 in substantially the same manner as the first switch SW1.

FIG. 9 shows an example of the first through fourth switch control signals SW_C1 through SW_C4 applied during a half period of the first driving signal DRV1. It is assumed that the low level LL is "0" and the high level HL is "1". The order is a combination of the levels of the respective first through fourth switch control signals SW_C1 through SW_C4 at each timing. For instance, an order of 0001 indicates that the first through third switch control signals SW_C1 through SW_C3 are "0" and the fourth switch control signal SW_C4 is "1".

Since the order is sequentially changed during the half period of the first driving signal DRV1, the functions, described with reference to FIG. 8, of the transistors M1 through M10 having the same gate voltage may be exchanged. For instance, when the order is "1000", the first switch SW1 is in the state shown in (b) of FIG. 8B, and therefore, the functions of the first and second transistors M1 and M2 may be exchanged and the functions of the sixth and seventh transistors M6 and M7 may be exchanged. Here, that the functions are exchanged means that the first transistor M1 is connected to the second output terminal ON2 instead of the first output terminal ON1 and the second transistor M2 is connected to the first output terminal ON1 instead of the second output terminal ON2, and therefore, the function of the current IM1 flowing in the first transistor M1 is exchanged with the function of the current IM2 flowing in the second transistor M2 in Equations 1 and 2.

The transistors M1 through M10 are supposed to have the same size (e.g., length and width), but they may have a different size due to a variance in manufacturing processes. However, when the functions of the transistors M1 through M10 having the same gate voltage are exchanged by sequentially changing the order during the half period of the first driving signal DRV1, noise occurring in the first and second sensed current signals ISS1_1 and ISS1_2 due to a difference in size among the transistors M1 through M10 can be minimized.

Referring to FIG. 10, when the first driving signal DRV1 is applied to the first driving line X1 during a first driving time TD1, the first current signal IS1 is output via a mutual capacitance MC and the first sensing line Y1. The phase of the first sensed current signal ISS1_1 is the same as that of the first current signal IS1 and the phase of the second sensed current signal ISS1_2 is opposite to that of the first current signal IS1. For the sake of convenience, it is assumed that there is no delay taken for the first driving signal DRV1 input to the touch screen panel 20 to be output as the first current signal IS1.

Figure 11:
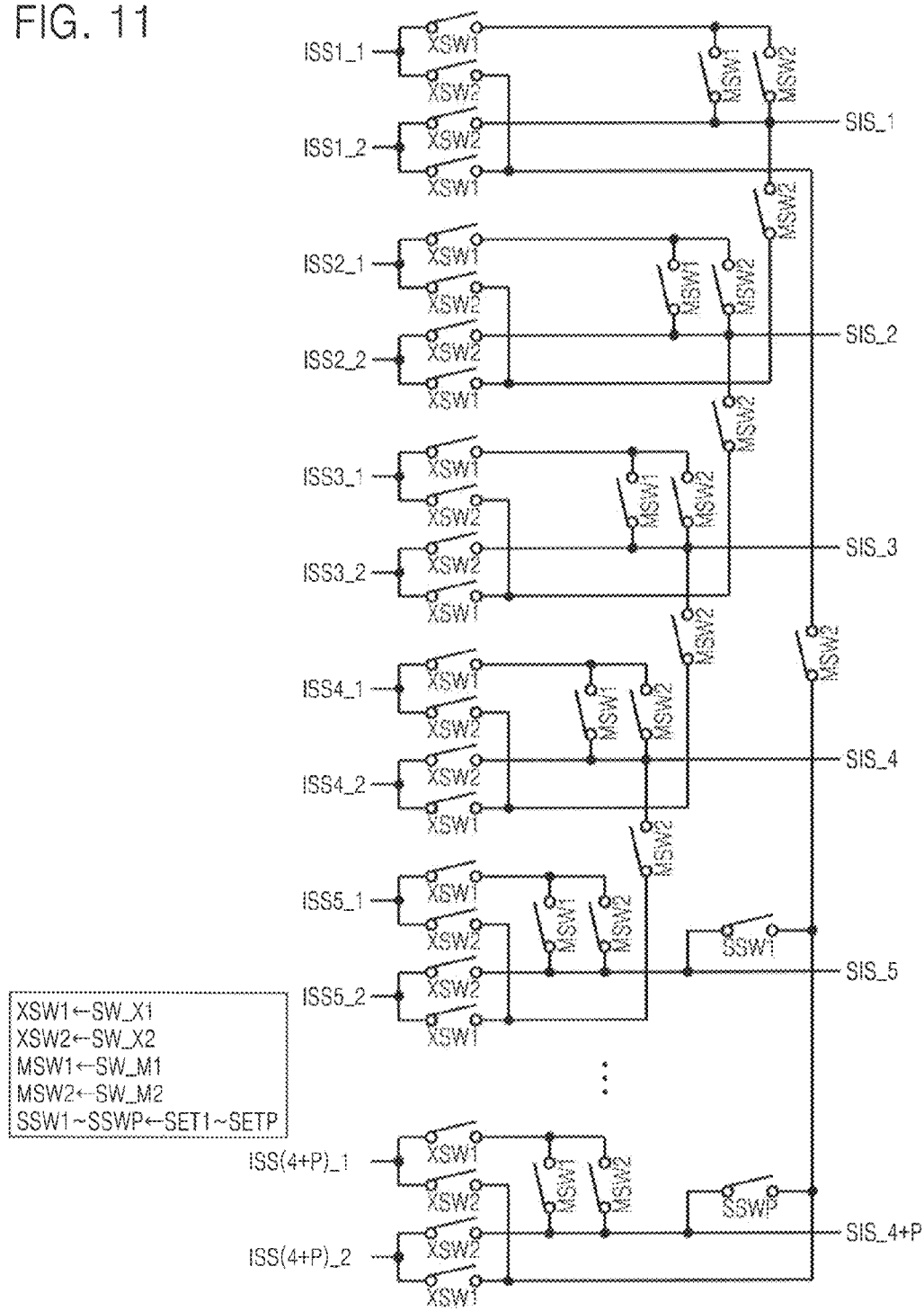
FIG. 11 is a detailed block diagram of a mixer illustrated in FIG. 5, according to an exemplary embodiment of the inventive concept.
Figure 12:
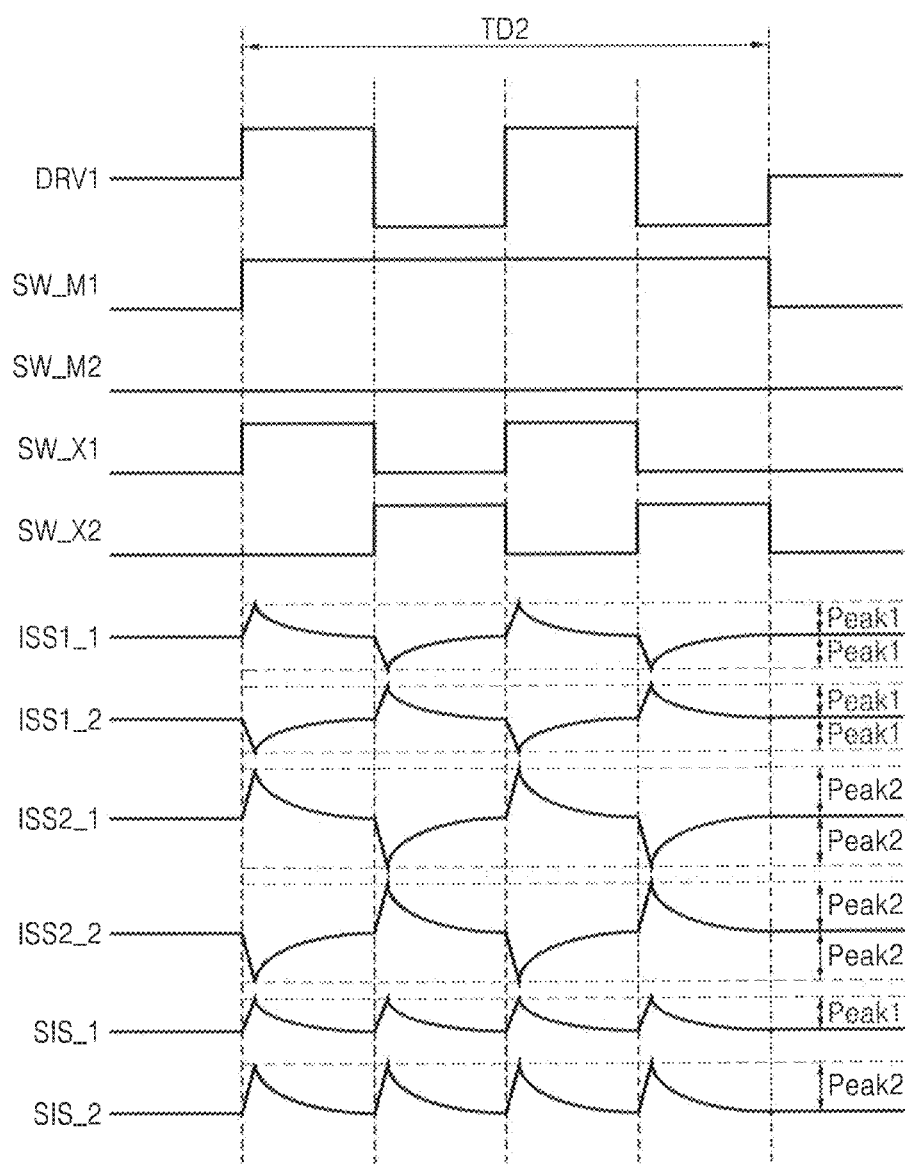
FIG. 12 is a diagram for explaining the operation of the mixer illustrated in FIG. 11 in a single mode, according to an exemplary embodiment of the inventive concept.
Figure 13:
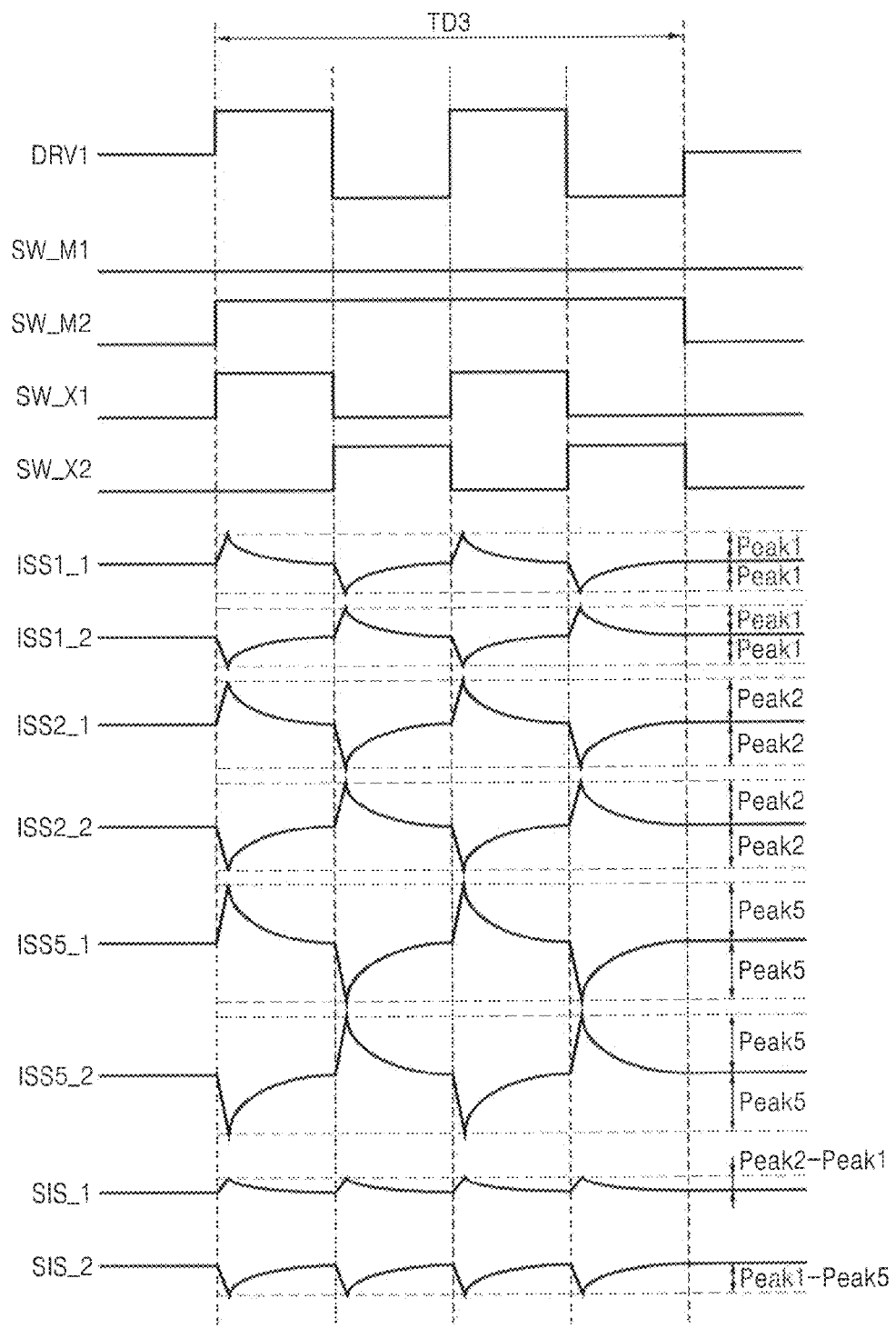
FIG. 13 is a diagram for explaining the operation of the mixer illustrated in FIG. 11 in a differential mode, according to an exemplary embodiment of the inventive concept.

FIG. 11 is a detailed block diagram of the mixer 230 illustrated in FIG. 5, according to an exemplary embodiment of the inventive concept. FIG. 12 is a diagram for explaining the operation of the mixer 230 illustrated in FIG. 11 in a single mode, according to an exemplary embodiment of the inventive concept. FIG. 13 is a diagram for explaining the operation of the mixer 230 illustrated in FIG. 11 in a differential mode, according to an exemplary embodiment of the inventive concept.

Referring to FIGS. 5 and 11, the mixer 230 may include first mixing switches XSW1, second mixing switches XSW2, first mode switches MSW1, second mode switches MSW2, and setting switches SSW1 through SSWP. FIG. 11 shows a case where the current conveyor 210 includes five unit current conveyors 210_1 through 210_5, in other words, m=5.

When the first mixing switches XSW1 are connected to receive the first sensed current signals ISS1_1, ISS2_1, ISS3_1, ISS4_1, and ISS5_1, they are connected to the first mode switches MSW1 and the second mode switches MSW2. When the first mixing switches XSW1 are connected to receive the second sensed current signals ISS1_2, ISS2_2, ISS3_2, ISS4_2, and ISS5_2, they are connected to the second mode switches MSW2.

When the second mixing switches XSW2 are connected to receive the first sensed current signals ISS1_1, ISS2_1, ISS3_1, ISS4_1, and ISS5_1, they are connected to the second mode switches MSW2. When the second mixing switches XSW2 are connected to receive the second sensed current signals ISS1_2, ISS2_2, ISS3_2, ISS4_2, and ISS5_2, they are connected to the first mode switches MSW1, the second mode switches MSW2, and the sine-shape resampler 250.

The mixer control signals MCS illustrated in FIG. 5 include a signal for controlling the first mixing switches XSW1, a signal for controlling the second mixing switches XSW2, a signal for controlling the first mode switches MSW1, a signal for controlling the second mode switches MSW2, and a signal for controlling the setting switches SSW1 through SSWP. The first mixing switches XSW1 may be opened or shorted according to a first mixing switch signal SW_X1 and the second mixing switches XSW2 may be opened or shorted according to a second mixing switch signal SW_X2. The first mixing switch signal SW_X1 may be at the high level when the driving signals DRV are at the high level and it may be at the low level when the driving signals DRV are at the low level. The second mixing switch signal SW_X2 may be at the low level when the driving signals DRV are at the high level and it may be at the high level when the driving signals DRV are at the low level. The first and second mixing switch signals SW_X1 and SW_X2 may be called demodulation signals.

As described above with reference to FIG. 3, the control logic circuit 300 may compensate for the delays of the driving signals DRV and the mixer control signals MCS using the phase delay information when generating the mixer control signals MCS.

The first mode switches MSW1 are connected to the first mixing switches XSW1 that have been connected to receive the first sensed current signals ISS1_1, ISS2_1, ISS3_1, ISS4_1, and ISS5_1 and are connected to the second mixing switches XSW2 that have been connected to receive the second sensed current signals ISS1_2, ISS2_2, ISS3_2, ISS4_2, and ISS5_2.

Each of the second mode switches MSW2 is connected to a first mixing switch XSW1 connected to receive one of the first sensed current signals ISS1_1, ISS2_1, ISS3_1, ISS4_1, and ISS5_1 and is connected to a second mixing switch XSW2 connected to receive the second sensed current signal ISS1_2, ISS2_2, ISS3_2, ISS4_2, or ISS5_2, which corresponds to the one first sensed current signal. In addition, each second mode switch MSW2 is connected to a second mixing switch XSW2 connected to receive another one of the first sensed current signals ISS1_1, ISS2_1, ISS3_1, ISS4_1, and ISS5_1 except for the one first sensed current signal and is connected to a first mixing switch XSW1 connected to receive the second sensed current signal ISS1_2, ISS2_2, ISS3_2, ISS4_2, or ISS5_2, which corresponds to the another first sensed current signal.

In other words, each second mode switch MSW2 may be connected so that the first sensed current signal ISS1_1, ISS2_1, ISS3_1, ISS4_1, or ISS5_1 and the second sensed current signal ISS1_2, ISS2_2, ISS3_2, ISS4_2, or ISS5_2 which are respectively received from adjacent channels (e.g., ISS1_2 received from the first unit current conveyor 210_1 and ISS2_1 received from the second unit current conveyor 210_2) are added up and the first sensed current signal ISS1_1 or ISS5_1 and the second sensed current signal ISS1_2 or ISS5_2 which are received from respective peripheral channels (e.g., ISS1_1 received from the first unit current conveyor 210_1 and ISS5_2 received from the fifth unit current conveyor 210_5) are added up.

The first mode switches MSW1 may be opened or shorted according to a first mode switch signal SW_M1 and the second mode switches MSW2 may be opened or shorted according to a second mode switch signal SW_M2. The first mode switch signal SW_M1 and the second mode switch signal SW_M2 may be determined according to a request of the host controller 40 or a decision of the control logic circuit 300. The first and second mode switch signals SW_M1 and SW_M2 may be called mode selection signals.

The number of the sensing lines Y1 through Ym included in the touch screen panel 20 may vary with exemplary embodiments of the inventive concept, and therefore, the mixer 230 may also include the setting switches SSW1 through SSWP to increase compatibility. For instance, when the number of the sensing lines Y1 through Ym is 10, the first through fifth setting switches SSW1 through SSW5 may be opened and the sixth setting switch SSW6 may be shorted according to setting signals SET1 through SET6.

The setting switches SSW1 through SSWP are provided to increase compatibility. The state of the setting switches SSW1 through SSWP are maintained constant once the touch screen panel 20 to which the touch screen sensor IC 30 is connected is decided. The mixer 230 illustrated in FIG. 11 includes the first setting switch SSW1 corresponding to a fifth channel and the other setting switches SSW2 through SSWP, but the inventive concept is not restricted to the exemplary embodiment illustrated in FIG. 11.

Referring to FIG. 12, the mixer 230 operates in a single mode when the first mode switch signal SW_M1 is at the high level and the second mode switch signal SW_M2 is at the low level in a second driving time TD2. For the sake of convenience, only the first subtracted current signal SIS_1 and the second subtracted current signal SIS_2 will be explained.

The first subtracted current signal SIS_1 is output by mixing portions of the first and second sensed current signals ISS1_1 and ISS1_2, which have a positive first peak value Peak1, according to the first mode switch signal SW_M1, the second mode switch signal SW_M2, the first mixing switch signal SW_X1, and the second mixing switch signal SW_X2. In the same manner, the second subtracted current signal SIS_2 is output by mixing portions of the first and second sensed current signals ISS2_1 and ISS2_2, which have a positive second peak value Peak2, according to the first mode switch signal SW_M1, the second mode switch signal SW_M2, the first mixing switch signal SW_X1, and the second mixing switch signal SW_X2.

Referring to FIG. 13, the mixer 230 operates in a differential mode when the first mode switch signal SW_M1 is at the low level and the second mode switch signal SW_M2 is at the high level in a third driving time TD3. For the sake of convenience, only the first subtracted current signal SIS_1 and the second subtracted current signal SIS_2 will be explained. It is assumed that the second peak value Peak2 is greater than the first peak value Peak1 and less than a fifth peak value Peak5.

The first subtracted current signal SIS_1 is output by adding the sensed current signals ISS1_1 and ISS1_2 received from the first unit current conveyor 210_1 and the sensed current signals ISS2_1 and ISS2_2 received from the second unit current conveyor 210_2 according to the first mode switch signal SW_M1, the second mode switch signal SW_M2, the first mixing switch signal SW_X1, and the second mixing switch signal SW_X2. The second subtracted current signal SIS_2 is output by adding the sensed current signals ISS1_1 and ISS1_2 received from the first unit current conveyor 210_1 and the sensed current signals ISS5_1 and ISS5_2 received from the fifth unit current conveyor 210_5 according to the first mode switch signal SW_M1, the second mode switch signal SW_M2, the first mixing switch signal SW_X1, and the second mixing switch signal SW_X2.

Figure 14:
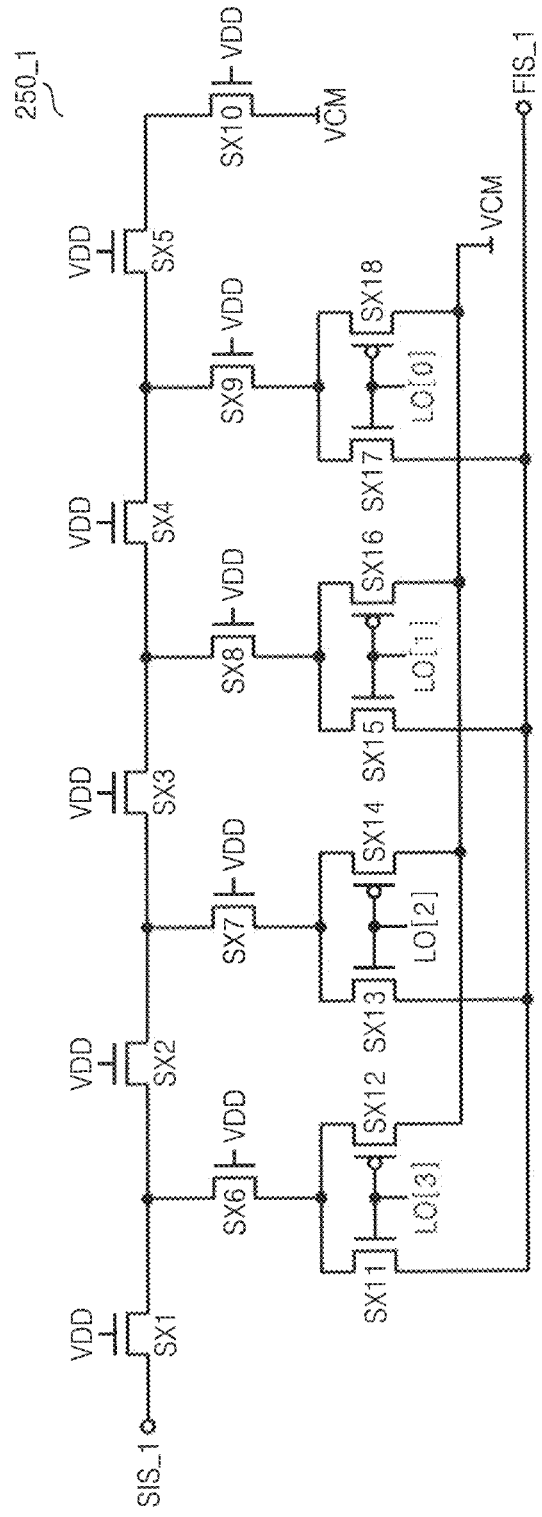
FIG. 14 is a diagram of a unit sine-shape resampler illustrated in FIG. 5, according to an exemplary embodiment of the inventive concept.
Figure 15:
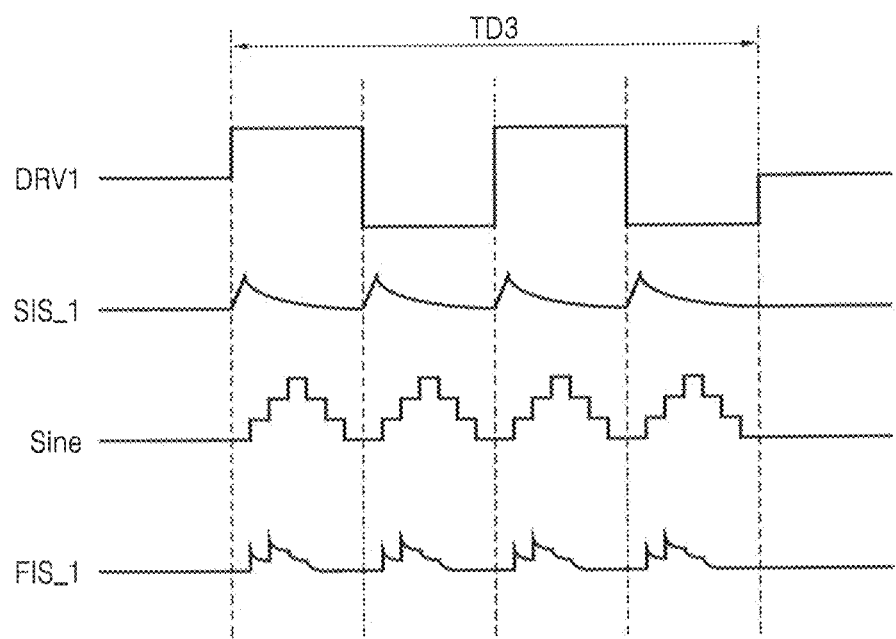
FIG. 15 is a timing chart showing the operation of the unit sine-shape resampler illustrated in FIG. 14, according to an exemplary embodiment of the inventive concept.

FIG. 14 is a diagram of the unit sine-shape resampler 250_1 illustrated in FIG. 5, according to an exemplary embodiment of the inventive concept. FIG. 15 is a timing chart showing the operation of the unit sine-shape resampler 250_1 illustrated in FIG. 14, according to an exemplary embodiment of the inventive concept.

Referring to FIGS. 5 and 14, the unit sine-shape resampler 250_1 may include a plurality of transistors SX1 through SX18. Only one unit sine-shape resampler 250_1 is described since the other unit sine-shape resamplers 250_2 through 250_m are substantially the same as the unit sine-shape resampler 250_1.

Each of the transistors SX1 through SX18 may be an NMOS transistor. The transistors SX1 through SX10 may be provided with the power supply voltage VDD for a gate voltage and the remaining transistors SX11 through SX18 may be provided with sine-shaped signals SPS, e.g., digital sine-wave signals LO[3] through LO[0] for the gate voltage. Although the sine-shaped signals SPS include the four digital sine-wave signals LO[3] through LO[0] in the current embodiment, the inventive concept is not restricted to the current embodiment.

The connection of the transistors SX1 through SX18 complies with the structure of a normal R-2R ladder digital-to-analog converter (DAC) that uses a voltage divider rule.

Each of the transistors SX1 through SX10 provided with the power supply voltage VDD for the gate voltage operates as a single resistor. The transistors SX11 through SX18 provided with the digital sine-wave signals LO[3] through LO[0] for the gate voltage operate as resistors according to the digital sine-wave signals LO[3] through LO[0], thereby outputting current to the first unit I-V converter 270_1 or the common voltage VCM. The resistors in the structure of an R-2R ladder DAC are replaced with the transistors SX1 through SX18 to increase the degree of integration of the touch screen sensor IC 30.

For instance, when the digital sine-wave signal LO[3] is at a low level (e.g., 0 V), the transistor SX11 is turned off and the transistor SX12 is turned on. Accordingly, current is output to the common voltage VCM through the transistor SX12. In addition, when the digital sine-wave signal LO[3] is at a high level (e.g., VDD), the transistor SX11 is turned on and the transistor SX12 is turned off. Accordingly, current is output to the first unit I-V converter 270_1 through the transistor SX11.

Referring to FIG. 15, it is assumed that the first subtracted current signal SIS_1 is the first subtracted current signal. SIS_1 during the third driving time TD3 in FIG. 13. In FIG. 15, a sine shape "Sine" is the first fine current signal FIS_1 when a constant current (e.g., 10 V) instead of the first subtracted current signal SIS_1 is supplied to the transistor SX1. In other words, the sine shape "Sine" illustrated in FIG. 15 is a waveform obtained when there are a total of four current levels generated by the digital sine-wave signals LO[3] through LO[0] and the current levels sequentially change to approximate a sine wave.

When the first subtracted current signal SIS_1 is applied to the transistor SX1, the product of the first subtracted current signal SIS_1 and the sine shape "Sine" is generated. The sine shape "Sine" may have the same frequency (e.g., 400 kHz) as the first driving signal DRV1, and therefore, the first fine current signal FIS_1 includes only a component of frequency the same as the first driving signal DRV1 among components of the first subtracted current signal SIS_1 and a DC component. In other words, the unit sine-shape resampler 250_1 removes noise existing in frequency ranges other than the frequency of the first driving signal DRV1 from the first subtracted current signal SIS_1, thereby generating the first fine current signal FIS_1.

Figure 16:
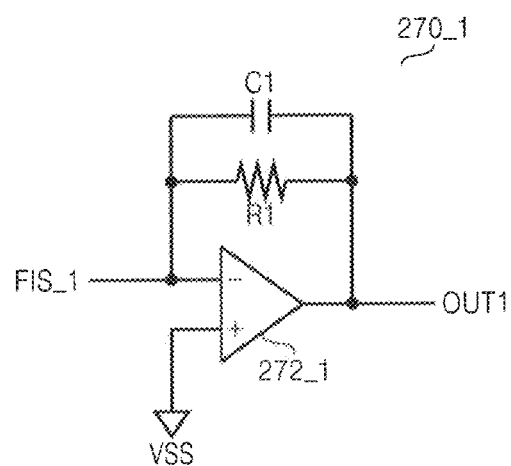
FIG. 16 is a diagram of a unit current-to-voltage (I-V) converter illustrated in FIG. 5, according to an exemplary embodiment of the inventive concept.
Figure 17:
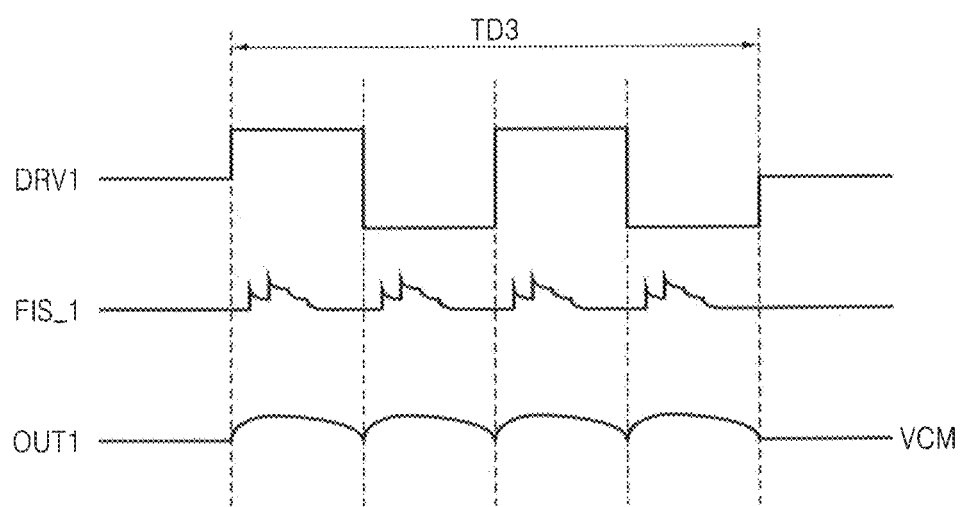
FIG. 17 is a timing chart showing the operation of the unit I-V converter illustrated in FIG. 16, according to an exemplary embodiment of the inventive concept.

FIG. 16 is a diagram of the unit I-V converter 270_1 illustrated in FIG. 5, according to an exemplary embodiment of the inventive concept. FIG. 17 is a timing chart showing the operation of the unit I-V converter 270_1 illustrated in FIG. 16, according to an exemplary embodiment of the inventive concept.

Referring to FIGS. 5 and 16, the unit I-V converter 270_1 may include a first capacitor C1, a first resistor R1, and an operational amplifier 272_1. Only one unit I-V converter 270_1 will be explained since the other unit I-V converters 270_2 through 270_m are substantially the same as the unit I-V converter 270_1.

The first capacitor C1 and the first resistor R1 together form a feedback route between an inverting input terminal and an output terminal of the operational amplifier 272_1. The operational amplifier 272_1 receives the first fine current signal FIS_1 through the inverting input terminal and the reference voltage VSS through a non-inverting terminal. In other words, the first capacitor C1, the first resistor R1, and the operational amplifier 272_1 together function as a low pass filter. A cut-off frequency and conversion gain may be determined by the value of the first capacitor C1 and the value of the first resistor R1.

Referring to FIG. 17, it is assumed that the first fine current signal FIS_1 is the first fine current signal FIS_1 during the third driving time TD3 illustrated in FIG. 15. The first output voltage signal OUT1 includes only the DC component with the component of the frequency (e.g., 400 kHz) of the first driving signal DRV1 removed from the first fine current signal FIS_1. Accordingly, the unit I-V converter 270_1 simultaneously performs the function of a low pass filter and I-V conversion, thereby generating the first output voltage signal OUT1 corresponding to the first fine current signal FIS_1.

Figure 18:
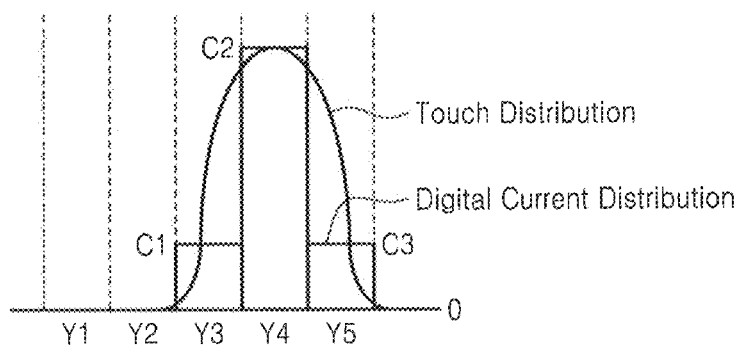
FIG. 18 is a graph for explaining the operation of a micro controller unit (MCU) illustrated in FIG. 3, according to an exemplary embodiment of the inventive concept.

FIG. 18 is a graph for explaining the operation of the MCU 520 illustrated in FIG. 3, according to an exemplary embodiment of the inventive concept. FIG. 19 is a table for explaining the operation of the MCU 520 according to the graph illustrated in FIG. 18, according to an exemplary embodiment of the inventive concept.

Referring to FIG. 3 and FIGS. 5 through 18, it is assumed that the touch screen panel 20 includes five sensing lines Y1 through Y5 for the sake of convenience. Touch distribution corresponds to variation in a mutual capacitance profile of the touch screen panel 20, which appears across the sensing lines Y1 through Y5 when a finger or conductive substance touches the touch screen panel 20. Digital current distribution is the distribution of digital current levels (e.g., 0, C1, C2, and C3) corresponding to the touch distribution.

FIG. 19 shows digital voltage signals DVS1 through DVS5 output through the sensor circuit block 200 and the ADC block 510 in the differential mode. The digital voltage signals DVS1 through DVS5 include the difference between the products of the digital current levels (e.g., 0, C1, C2, and C3) and an I-V conversion gain (e.g., Zd). The digital voltage signals DVS1 through DVS5 do not include common noise due to the differential mode but include sensing noise E occurring in the sensor circuit block 200 and the ADC block 510. It is assumed that the sensing noise E is the same among the digital voltage signals DVS1 through DVS5.

The MCU 520 may sequentially generate integrated digital voltage signals DVS by sequentially integrating the digital voltage signals DVS1 through DVS5. At this time, the MCU 520 may set a reference sensing line (Y1 in FIG. 19) and may set a digital voltage signal output from the reference sensing line to a random value (0 in FIG. 19).

The MCU 520 may compensate for the sensing noise E, which will be described later, and then correct the touch voltage signal TVS using the random value set as the value of the digital voltage signal of the reference sensing line. For instance, when the random value is 0 and one of the integrated digital voltage signals DVS has a negative value, the MCU 520 may correct the touch voltage signal TVS using the negative value and the random value of 0.

The MCU 520 may generate a result of integrating all of the digital voltage signals DVS1 through DVS5 corresponding to the sensing lines Y1 through Y5, e.g., (0)*Zd+E+(C1)*Zd+E+(C2−C1)*Zd+E+(C3−C2)*Zd+E+(0−C3)*Zd+E=5E. The MCU 520 may also generate an error compensation by applying a weight to the integration result 5E according to an integration order. The MCU 520 may calculate a final value by subtracting the error compensation from each of the integrated digital voltage signals DVS.

As described above with reference to FIG. 3, the touch voltage signal TVS includes X and Y coordinates of a touch point where a touch occurs and information about a touch level for each coordinate. The X and V coordinates of the touch point correspond to a position corresponding to a final value (e.g., (3,3)) when the third driving line X3 is driven and a final value corresponding to the third sensing line Y3 is C1*Zd) and the final value corresponds to information about the touch level for each coordinate (e.g., C1*Zd at the position (3,3)).

Figure 20:
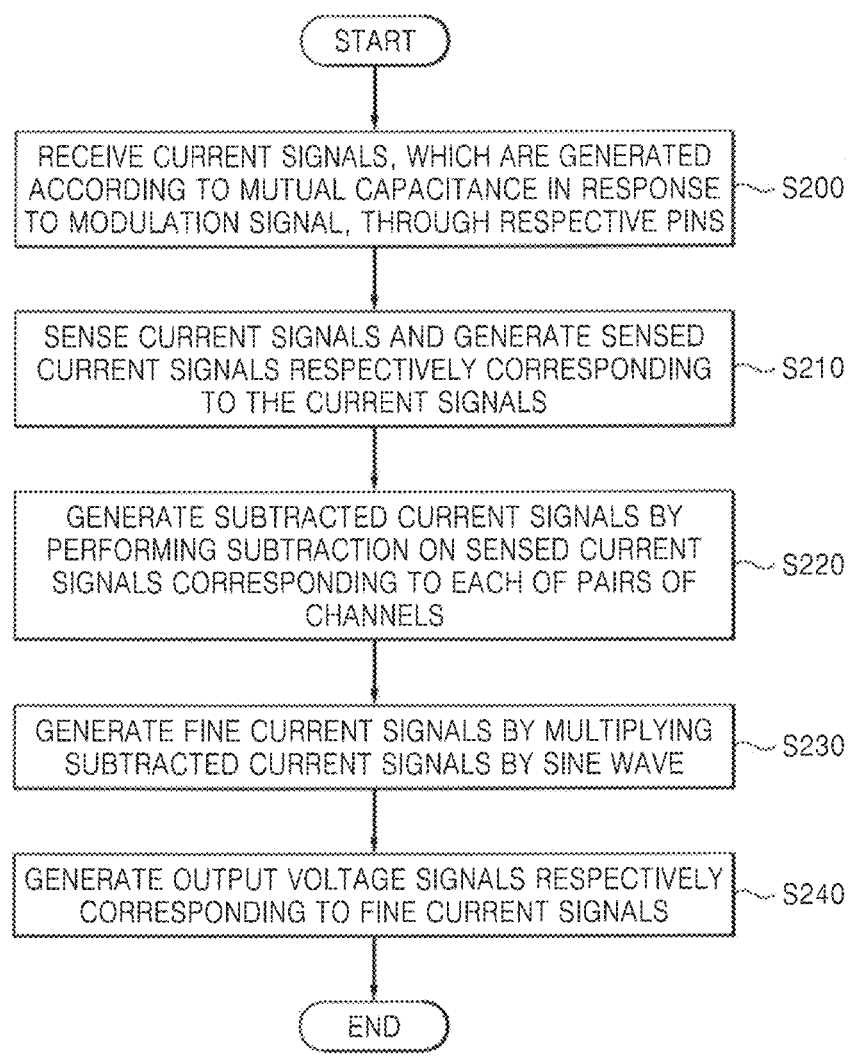
FIG. 20 is a flowchart of a method of operating the touch screen sensor IC illustrated in FIG. 3, according to an exemplary embodiment of the inventive concept.

FIG. 20 is a flowchart of a method of operating the touch screen sensor IC 30 illustrated in FIG. 3, according to an exemplary embodiment of the inventive concept Referring to FIGS. 1, 3, 5, and 20, the pins 92_1 through 92_m may respectively receive the current signals IS1 through ISm, which are generated in response to modulation signals, e.g., the driving signals DRV respectively applied to the driving lines X1 through Xn of the touch screen panel 20, in operation S200.

The current conveyor 210 may sense the current signals IS1 through ISm received from the pins 92_1 through 92_m connected to the sensing lines Y1 through Ym and generate a plurality of the sensed current signals ISS1_1 through ISSm_2, each pair of which corresponds to each of the current signals IS1 through ISm, in operation S210. The sensed current signals ISS1_1 through ISSm_2 include the first sensed current signals ISS1_1 through ISSm_1 and the second sensed current signals ISS1_2 through ISSm_2 respectively corresponding to the first sensed current signals ISS1_1 through ISSm_1. The phase of each of the first sensed current signals ISS1_1 through ISSm_1 may be opposite to that of a corresponding one of the second sensed current signals ISS1_2 through ISSm_2.

The mixer 230 may generate the subtracted current signals SIS_1 through SIS_m by performing a subtraction on sensed current signals corresponding to each of the pairs of the pins 92_1 through 92_m among the sensed current signals ISS1_1 through ISSm_2 in operation S220. Two pins in each of the pairs of the pins 92_1 through 92_m may be pins respectively corresponding to two adjacent channels or two peripheral channels. The mixer 230 may generate the subtracted current signals SIS_1 through SIS_m by adding one of the first sensed current signals ISS1_1 through ISSm_1, which corresponds to one of two pins in each of the pairs of the pins 92_1 through 92_m, and one of the second sensed current signals ISS1_2 through ISSm_2, which corresponds to the other one of the two pins.

The sine-shape resampler 250 may generate the fine current signals FIS_1 through FIS_m by multiplying the subtracted current signals SIS_1 through SIS_m by a sine wave in operation S230. The I-V converter 270 generates the output voltage signals OUT1 through OUTm respectively corresponding to the fine current signals FIS_1 through FIS_m in operation S240. The I-V converter 270 may remove a high-frequency component from the fine current signals FIS_1 through FIS_m.

As described above, according to an exemplary embodiment of the inventive concept, a touch screen sensor IC generates an output signal through subtraction between current signals, thereby removing a common noise component, reducing the delay between input and output, and increasing a dynamic range. In addition, the touch screen sensor IC effectively removes high-frequency noise using a sine wave.

While the inventive concept has been particularly shown and described with reference to exemplary embodiments thereof, it will be understood by those of ordinary skill. In the art that various changes in form and detail may be made therein without departing from the spirit and scope of the inventive concept as defined by the following claims.

What is claimed is:

1. A touch screen sensor integrated circuit, comprising:
a plurality of pins configured to receive a plurality of current signals, wherein each current signal is generated according to mutual capacitance in response to a modulation signal;
a current conveyor configured to receive the current signals from the pins, sense the current signals and generate a plurality of pairs of sensed current signals each pair corresponding to a respective one of the current signals, wherein each pair of the sensed current signals comprises first and second sense current signals;
a delay table configured to store phase delay information;
a control logic configured to generate a mixer control signal and control a timing of the mixer control signal using the phase delay information; and
a mixer configured to receive the plurality of pairs of sensed current signals from the current conveyor and generate a plurality of subtracted current signals, wherein each subtracted current signal is generated by performing a subtraction on sensed current signals corresponding to a pair of the pins, and wherein the mixer generates the plurality of subtracted current signals in response to the mixer control signal.

2. The touch screen sensor integrated circuit of claim 1, wherein in each pair of the sensed current signals a phase of the first sensed current signal is opposite to a phase of the second sensed current signal.

3. The touch screen sensor integrated circuit of claim 2, wherein the current conveyor comprises a plurality of unit current conveyors respectively corresponding to the pins, and each of the unit current conveyors comprises:
an operational amplifier configured to generate a first control voltage and a second control voltage according to one of the current signals; and
a current copy circuit configured to generate one of the first sensed current signals and one of the second sensed current signals according to the first control voltage and the second control voltage.

4. The touch screen sensor integrated circuit of claim 2, wherein the mixer adds one of the first sensed current signals, which corresponds to one of two pins in a pair, and one of the second sensed current signals, which corresponds to the other one of the two pins, according to a demodulation signal.

5. The touch screen sensor integrated circuit of claim 4, wherein the two pins correspond to adjacent channels.

6. The touch screen sensor integrated circuit of claim 4, wherein the two pins correspond to peripheral channels.

7. The touch screen sensor integrated circuit of claim 1, further comprising a sine-shape resampler configured to generate fine current signals by multiplying the subtracted current signals by a sine wave.

8. The touch screen sensor integrated circuit of claim 7, wherein the sine-shape resampler comprises a plurality of unit sine-shape resamplers respectively corresponding to the subtracted current signals, and
each of the unit sine-shape resamplers is an R-2R ladder digital-to-analog converter comprising a plurality of transistors that operate according to digital sine-wave signals.

9. The touch screen sensor integrated circuit of claim 7, further comprising a current-to-voltage converter configured to generate output voltage signals respectively corresponding to the fine current signals.

10. The touch screen sensor integrated circuit of claim 9, further comprising:
   an analog-to-digital converter (ADC) configured to convert the output voltage signals into digital voltage signals; and
   a micro controller unit (MCU) configured to sequentially integrate the digital voltage signals and generate touch voltage signals respectively corresponding to the current signals.

11. The touch screen sensor integrated circuit of claim 10, wherein the pins comprise first through m-th pins respectively connected to first through m-th sensing lines of a touch screen panel, and
   the MCU compensates the sequentially integrated digital voltage signals using a result of integrating the digital voltage signals respectively corresponding to the first through m-th pins.

12. A touch screen sensor integrated circuit, comprising:
   a plurality of pins configured to receive a plurality of current signals, wherein each current signal is generated according to mutual capacitance in response to a modulation signal;
   a current conveyor configured to sense the current signals and generate a plurality of pairs of sensed current signals each pair corresponding to one of the current signals, wherein each pair of the sensed current signals comprises first and second sensed current signals;
   a delay table configured to store phase delay information;
   a control logic configured to generate a mixer control signal and control a timing of the mixer control signal using the phase delay information; and
   a mixer configured to output the sensed current signals according to a mode selection signal, or generate a plurality of subtracted current signals, wherein each subtracted current signal is generated by performing a subtraction on sensed current signals corresponding to a pair of the pins, and wherein the mixer generates the plurality of subtracted current signals in response to the mixer control signal.

13. The touch screen sensor integrated circuit of claim 12, wherein in each pair of the sensed current signals a phase of the first sensed current signal is opposite to a phase of the second sensed current signal.

14. The touch screen sensor integrated circuit of claim 13, wherein the current conveyor comprises a plurality of unit current conveyors respectively corresponding to the pins, and each of the unit current conveyors comprises:
   an operational amplifier configured to generate a first control voltage and a second control voltage according to one of the current signals; and
   a current copy circuit configured to generate one of the first sensed current signals and one of the second sensed current signals according to the first control voltage and the second control voltage.

15. The touch screen sensor integrated circuit of claim 13, wherein the mixer adds one of the first sensed current signals, which corresponds to one of two pins in a pair, and one of the second sensed current signals, which corresponds to the other one of the two pins, according to a demodulation signal.

16. The touch screen sensor integrated circuit of claim 15, wherein the two pins correspond to adjacent channels.

17. A touch screen sensor integrated circuit, comprising:
   a current conveyor configured to generate a pair of sensed current signals for each received current signal;
   a delay table configured to store phase delay information;
   a control logic configured to generate a mixer control signal and control a timing of the mixer control signal using the phase delay information;
   a mixer configured to perform a subtraction operation on the pairs of sensed current signals to generate a plurality of subtracted current signals, wherein the mixer generates the plurality of subtracted current signals in response to the mixer control signal;
   a sine-shape resampler configured to generate a plurality of fine current signals by multiplying the subtracted current signals by a sine wave; and
   a current converter configured to generate a plurality of output voltage signals by removing a high-frequency component of the fine current signals.

18. The touch screen sensor integrated circuit of claim 17, further comprising:
   an analog-to-digital converter configured to convert the output voltage signals into digital voltage signals; and
   a micro controller unit configured to integrate the digital voltage signals to generate a touch voltage signal corresponding to the received current signals.

* * * * *